US011502871B2

(12) United States Patent
Sundararajan et al.

(10) Patent No.: US 11,502,871 B2
(45) Date of Patent: *Nov. 15, 2022

(54) DYNAMIC DISCOVERY OF PEER NETWORK DEVICES ACROSS A WIDE AREA NETWORK

(71) Applicant: Cisco Technology, Inc., San Jose, CA (US)

(72) Inventors: Balaji Sundararajan, Fremont, CA (US); Vivek Agarwal, Campbell, CA (US); Harish A. Kapadia, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/467,075

(22) Filed: Sep. 3, 2021

(65) Prior Publication Data

US 2021/0399920 A1     Dec. 23, 2021

Related U.S. Application Data

(63) Continuation of application No. 16/653,735, filed on Oct. 15, 2019, now Pat. No. 11,153,119.

(51) Int. Cl.

| | | |
|---|---|---|
| *H04L 12/46* | (2006.01) | |
| *H04L 41/0823* | (2022.01) | |
| *H04L 9/40* | (2022.01) | |
| *H04L 41/0806* | (2022.01) | |
| *H04L 49/25* | (2022.01) | |

(Continued)

(52) U.S. Cl.
CPC ...... *H04L 12/4633* (2013.01); *H04L 41/0806* (2013.01); *H04L 41/0823* (2013.01);
(Continued)

(58) Field of Classification Search
CPC ............ H04L 12/4633; H04L 41/0806; H04L 41/0823; H04L 41/0893; H04L 41/0896;
(Continued)

(56) References Cited

U.S. PATENT DOCUMENTS

| | | |
|---|---|---|
| 6,667,700 B1 | 12/2003 | McCanne et al. |
| 7,120,666 B2 | 10/2006 | McCanne et al. |

(Continued)

OTHER PUBLICATIONS

"WAN and Application Optimization Solution Guide," Cisco, Aug. 2008, pp. 1-238.

*Primary Examiner* — George C Neurauter, Jr.
(74) *Attorney, Agent, or Firm* — Polsinelli

(57) ABSTRACT

A network controller can register WAN edge routers and WAN optimizers distributed across a WAN. The controller can receive a request to establish a WAN optimized connection between first and second hosts. The controller can identify a first WAN optimizer to perform first services (e.g., de-duplication, compression, application acceleration, caching, etc.) for first traffic from the first host to the second host and first complementary services for second traffic from the second host to the first host, and a second WAN optimizer for the second traffic and second complementary services for the first traffic. The controller can establish the optimized connection comprising a first path including the first host, WAN optimizer, and router; a second path including the first router and a second router, and a third path including the second router, WAN optimizer, and host. The controller can route the first and second traffic through the optimized connection.

20 Claims, 11 Drawing Sheets

(51) Int. Cl.
*H04L 41/0896* (2022.01)
*H04L 41/0893* (2022.01)
*H04L 45/24* (2022.01)
*H04L 47/20* (2022.01)

(52) U.S. Cl.
CPC ...... *H04L 41/0893* (2013.01); *H04L 41/0896* (2013.01); *H04L 45/24* (2013.01); *H04L 49/25* (2013.01); *H04L 63/029* (2013.01); *H04L 47/20* (2013.01); *H04L 63/0263* (2013.01); *H04L 63/20* (2013.01)

(58) Field of Classification Search
CPC ......... H04L 45/24; H04L 47/20; H04L 49/25; H04L 63/0263; H04L 63/029; H04L 63/20
See application file for complete search history.

(56) References Cited

U.S. PATENT DOCUMENTS

| | | | |
|---|---|---|---|
| 7,873,060 | B2 | 1/2011 | Luo et al. |
| 8,503,332 | B2 | 8/2013 | Luo et al. |
| 8,516,158 | B1 | 8/2013 | Wu et al. |
| 8,725,894 | B2 | 5/2014 | Sridharan et al. |
| 8,739,244 | B1 | 5/2014 | Wu et al. |
| 8,855,114 | B2 | 10/2014 | Haigh et al. |
| 9,172,603 | B2 | 10/2015 | Padmanabhan et al. |
| 9,300,598 | B2 | 3/2016 | Haigh et al. |
| 9,300,600 | B2 | 3/2016 | Haigh et al. |
| 9,717,021 | B2 | 7/2017 | Hughes et al. |
| 9,774,570 | B2 | 9/2017 | Luo et al. |
| 9,882,878 | B2 | 1/2018 | Luo et al. |
| 9,917,792 | B2 | 3/2018 | Haigh et al. |
| 10,101,981 | B2 | 10/2018 | Argumagam et al. |
| 10,313,930 | B2 | 6/2019 | Hughes et al. |
| 10,805,840 | B2 | 10/2020 | Hughes et al. |
| 10,841,192 | B1 | 11/2020 | Babaoglu et al. |
| 10,911,374 | B1 | 2/2021 | Kumar et al. |
| 2004/0215746 | A1 | 10/2004 | McCanne et al. |
| 2008/0281908 | A1 | 11/2008 | McCanne et al. |
| 2010/0098092 | A1 | 4/2010 | Luo et al. |
| 2015/0334034 | A1 | 11/2015 | Smedley et al. |
| 2017/0019303 | A1 | 1/2017 | Swamy et al. |
| 2017/0155590 | A1 | 6/2017 | Dillon et al. |
| 2020/0067831 | A1 | 2/2020 | Spraggins et al. |
| 2021/0203550 | A1 | 7/2021 | Thakkar et al. |

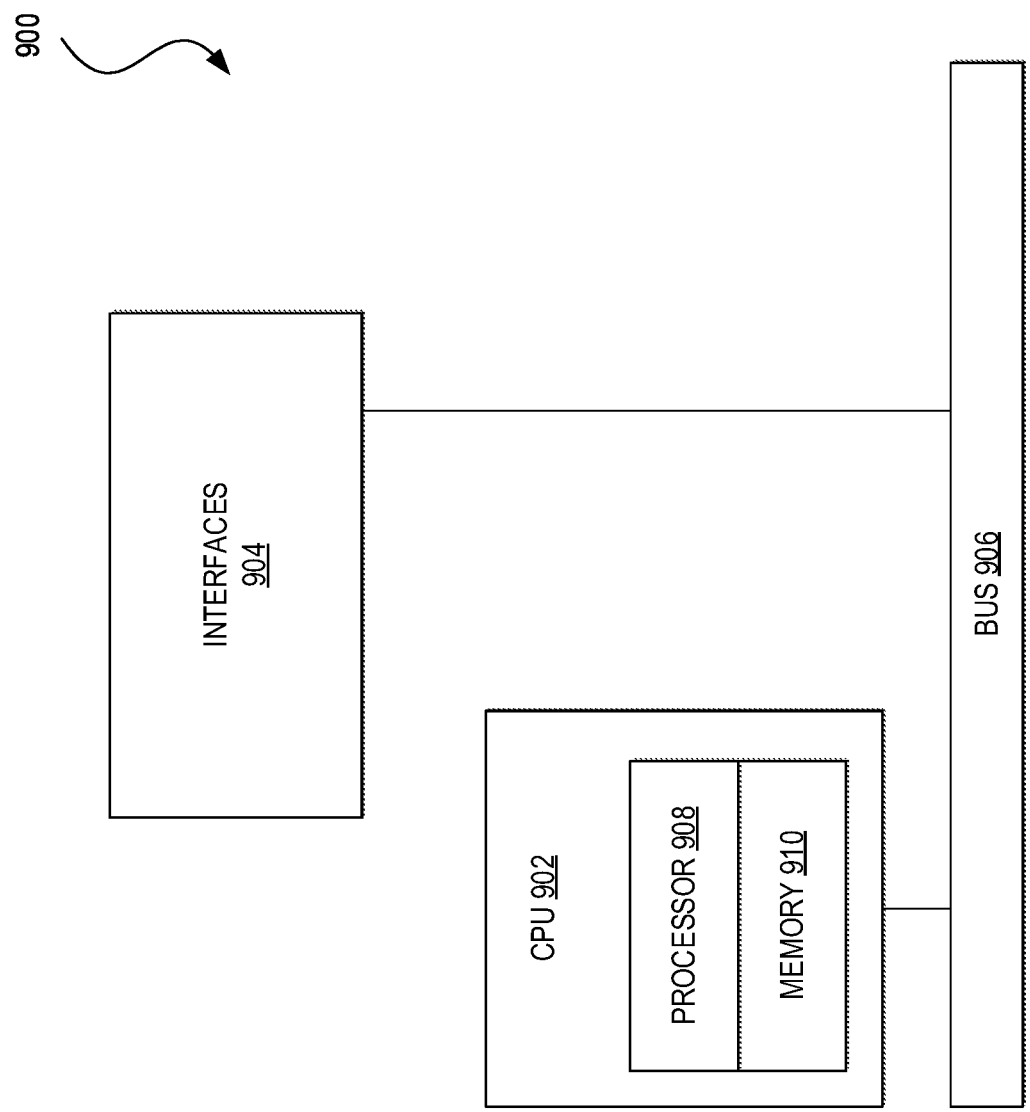

DYNAMIC DISCOVERY OF PEER NETWORK DEVICES ACROSS A WIDE AREA NETWORK

CROSS-REFERENCE TO RELATED APPLICATION

The instant application is a Continuation of, and claims priority to, U.S. patent application Ser. No. 16/653,735 entitled DYNAMIC DISCOVERY OF PEER NETWORK DEVICES ACROSS A WIDE AREA NETWORK, filed Oct. 15, 2019, the contents of which are herein incorporated by reference in its entirety.

TECHNICAL FIELD

The subject matter of this disclosure relates in general to the field of computer networking, and more particularly, to systems and methods for enabling Wide Area Network (WAN) optimization in a WAN fabric or overlay network.

BACKGROUND

A computer network is a geographically distributed collection of nodes interconnected by communication links and segments for transporting data between hosts, such as personal computers and workstations. Many types of networks are available, with the types ranging from Local Area Networks (LANs) and WANs to overlay networks and Software-Defined Networks (SDNs). LANs can connect nodes over dedicated private communications links located in the same general physical location, such as a building or campus. WANs, on the other hand, can connect geographically dispersed nodes over long-distance communications links, such as common carrier telephone lines, optical light paths, Synchronous Optical Networks (SONETs), Synchronous Digital Hierarchy (SDH) links, and so forth. LANs and WANs can include Layer 2 (L2) (of the Open Systems Interconnection (OSI) model) and/or Layer 3 (L3) networks and devices. The Internet is an example of a WAN that connects disparate networks throughout the world, providing global communication between nodes on various networks. The nodes can communicate over the network by exchanging discrete frames or packets of data according to predefined protocols, such as Transmission Control Protocol/Internet Protocol (TCP/IP). In this context, a protocol can refer to a set of rules defining how the nodes interact with each other. Computer networks may be further interconnected by an intermediate network device, such as a switch, router, hub, bridge, and so forth, to extend the effective size of each network.

WAN traffic can be subject to high packet loss, high latency, and low bandwidth (relative to LAN traffic). Some networks may deploy WAN optimizers to perform various network services, such as de-duplication, compression, transport flow optimization, application acceleration, caching, and so forth, to address these and other challenges associated with delivering traffic over WANs. A network can intercept and redirect traffic between hosts separated by a WAN to WAN optimizers in each of the hosts' respective LANs to optimize the traffic as it traverses the WAN. The complementary nature of WAN optimization can require coordination between WAN optimizers, including awareness by a WAN optimizer at one end of the network of a WAN optimizer at the other end of the network. In addition, peer WAN optimizers may be required to have corresponding capabilities. For example, to implement certain types of compression at one end of the connection, a WAN optimizer at the other end must be capable of and have the capacity (e.g., processing, memory, storage, etc.) to perform complementary types of decompression. To offload certain kinds of encryption to a WAN optimizer at one end of the connection, the other end must be capable of and have the capacity to perform complementary kinds of decryption, and so on.

In addition to peer WAN optimizers having matching capabilities, WAN optimization can also require path symmetry between hosts. For example, if a set of peer WAN optimizers perform network services for traffic traversing the network in one direction but return traffic traverses a different path in the opposite direction that excludes one or more of the WAN optimizers, then the return traffic may not be optimized. As another example, if traffic flows through one or more network security appliances (e.g., firewalls, Intrusion Detection and Prevention (IDP) systems, Virtual Private Network (VPN) gateways, etc.) operating along a path between WAN optimizers in one direction but return traffic does not take the same path in the other direction, the network security appliance may drop subsequent traffic in one or both directions and/or reset the connection between the hosts. This can significantly impair network performance. Some conventional networks may attempt to overcome these issues by manually configuring static routes between hosts. However, this approach can quickly become untenable in view of the number of hosts, network devices, virtual network segments, geographic locations, transport networks, and so on, that can make up today's enterprise networks.

BRIEF DESCRIPTION OF THE FIGURES

To provide a more complete understanding of the present disclosure and features and advantages thereof, reference is made to the following description, taken in conjunction with the accompanying drawings, in which:

FIG. 9 illustrates an example of a network device in accordance with an embodiment.

DESCRIPTION OF EXAMPLE EMBODIMENTS

Figure 1:
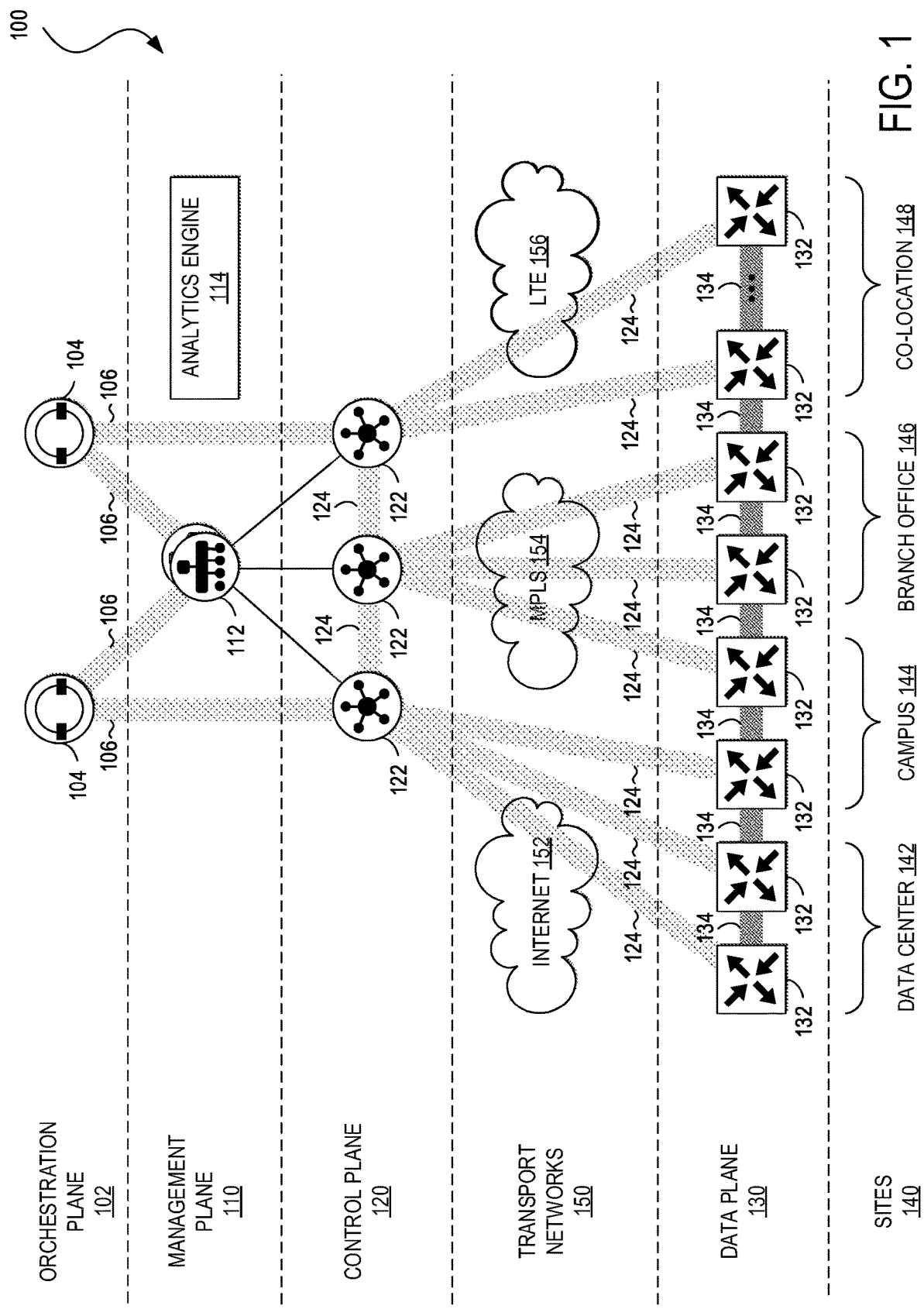
FIG. 1 illustrates an example of a network environment including a Wide Area Network (WAN) fabric or overlay network in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

OVERVIEW

Systems and methods can improve network performance by one or more network controllers dynamically discovering symmetric WAN optimizers distributed across a WAN fabric or overlay network and integrating the optimizers into the fabric. The network controllers can register a plurality of WAN edge routers and a plurality of WAN optimizers within a plurality of LANs separated by one or more WANs. The network can receive a request for a WAN optimized connection between a first host within a first LAN of the plurality of LANs and a second host within a second LAN of the plurality of LANs. The network controllers can identify a first WAN optimizer of the plurality of WAN optimizers that has capacity to perform one or more first WAN optimization services for first traffic transmitted from the first host to the second host and to perform one or more first complementary WAN optimization services for second traffic from the second host to the first host. The network controllers can also identify a second WAN optimizer of the plurality of WAN optimizers that has the capacity to perform one or more second WAN optimization services for the second traffic and to perform one or more second complementary WAN optimization services for the first traffic. The network can establish the WAN optimized connection between the first host and the second host. The WAN optimized connection can comprise a first path including the first host, the first WAN optimizer, and a first WAN edge router of the plurality of WAN edge routers local to the first WAN optimizer, a second path including the first WAN edge router and a second WAN edge router of the plurality of WAN edge routers local to the second WAN optimizer, and a third path including the second WAN edge router, the second WAN optimizer, and the second host. The network controllers can route the first traffic and the second traffic through the WAN optimized connection.

EXAMPLE EMBODIMENTS

WAN optimizers are physical or virtual network appliances that can peer with one another across a WAN to optimize traffic between remote hosts. A network can examine the traffic and apply policies to determine whether to route traffic through the WAN optimizers or allow it to pass through the WAN unoptimized. When the WAN optimizers process traffic, they may alter packet headers to establish a peering session and/or increase packet sequence numbers to help differentiate unoptimized traffic from optimized traffic and to gracefully handle when one or both of a pair of peer WAN optimizers become inaccessible. Some conventional networks may deploy firewalls, IDPs, and other network security appliances in the path between the WAN optimizers. The network security appliances can strip the alterations in the packet headers or drop packets of a flow with altered packet headers. In addition or alternatively, the network security appliances may drop packets of a flow whose sequence numbers are beyond a specified range of previous traffic.

Systems and methods of various embodiments can address the above and other deficiencies of prior art approaches for WAN optimization by one or more network controllers (e.g., a Software-Defined WAN (SD-WAN) controller, a WAN optimization controller, a Network Function Virtualization (NFV) orchestrator, etc.) dynamically discovering peer or symmetric WAN optimizers distributed across a WAN fabric or overlay network and integrating the optimizers into the WAN fabric. The WAN fabric can interconnect a plurality of LANs or sites (e.g., data centers, campus networks, branch office networks, co-location facilities, etc.) of an enterprise network to one another and to other networks (e.g., Infrastructure as a Service (IaaS), Platform as a Service (PaaS), Software as a Service (SaaS), and other Cloud Service Provider (CSP) networks) across one or more carrier or transport networks (e.g., the Internet, Multi-Protocol Label Switching (MPLS) networks, Long-Term Evolution (LTE) networks, etc.) by deploying one or more physical or virtual WAN edge routers within each of the LANs. The WAN edge routers can learn routes and services available in their sites, and advertise this information to the network controllers. The network controllers can learn the topology of the WAN fabric, including available WAN optimizers and other network appliances deployed in the overlay network.

In some embodiments, the network controllers can authenticate and register the plurality of WAN edge routers and the plurality of WAN optimizers within the plurality of LANs. The network controllers can monitor the plurality of WAN optimizers and/or the connections between the WAN edge routers and the WAN optimizers to evaluate the WAN optimizers' capacity to perform WAN optimization services (e.g., de-duplication, compression, transport flow optimization, application acceleration, caching, etc.) on traffic transmitted among the plurality of WAN edge routers. The network can receive a request for a WAN optimized connection between a first host (e.g., a physical or virtual server, computing system, computing device, endpoint, etc.) within a first LAN of the plurality of LANs and a second host within a second LAN of the plurality of LANs. For example, the network controllers can receive one or more network policies to perform WAN optimization services on certain types of traffic. The network controllers can configure the WAN edge routers with these policies. A WAN edge router local to the first host can apply the policies when the first host requests to connect to the second host to determine that the traffic between the first host and the second host should be routed through a WAN optimized connection. The network controllers can identify a first WAN optimizer among the plurality of registered WAN optimizers having the capacity to perform one or more first WAN optimization services for first traffic transmitted from the first host to the second host and to perform one or more first complementary WAN optimization services for second traffic (e.g., return traffic) from the second host to the first host. The network controllers can also identify a second WAN optimizer among the plurality of registered WAN optimizers having the capacity to perform one or more second WAN optimization services for the second traffic and to perform one or more second complementary WAN optimization services for the first traffic. The network can establish the WAN optimized connection between the first host and the second host. The WAN optimized connection can comprise a first path between the first host, the first WAN optimizer, and a first WAN edge router of the plurality of WAN edge routers local to the first WAN optimizer, a second path including the first WAN edge router and a second WAN edge router of the plurality of WAN edge routers local to the second WAN optimizer, and a third path including the second WAN edge router, the second WAN optimizer, and the second host. The network can route the first traffic and the second traffic through the WAN optimized connection.

Some conventional network security appliances (e.g., firewalls, IDPs, VPN gateways, etc.) drop traffic whose sequence number is outside of a specified range of previous traffic. In some embodiments, the network controllers can provision one or more network security appliances that are capable of allowing traffic whose sequence numbers are outside of the specified range of previous traffic. The network can route the first traffic and the second traffic through the network security appliances.

Some conventional networks may require a WAN optimizer to be in the same physical network or LAN as a host for performing WAN optimization services for that host's traffic. In some embodiments, there network controllers can determine there is no WAN optimizer local to the second host that has capacity to perform the one or more second WAN optimization services and the one or more second complementary WAN optimization services. The network controllers can select a WAN optimizer in a third LAN of the plurality of LANs (remote to the second host) based on evaluation of one or more first measurements (e.g., loss, latency, jitter, etc.) of a first tunnel between a local WAN edge router local to the second host and the first WAN edge router, one or more second measurements of a second tunnel between the local WAN edge router and the second WAN edge router, and one or more third measurements of a third tunnel between the second WAN edge router and the first WAN edge router. The network controllers can route the second traffic from the local WAN edge router to the second WAN optimizer via the second tunnel and the first traffic from the first WAN edge router to the second WAN optimizer via the third tunnel.

In some embodiments, the network controllers can determine there is no WAN optimizer local to the first host that has capacity to perform the one or more first WAN optimization services and the one or more first complementary WAN optimization services. The network controllers can select the first WAN optimizer in a third LAN of the plurality of LANs (remote to the first host) based on evaluation of one or more first measurements of a first tunnel between a local WAN edge router local to the first host and the second WAN edge router, one or more second measurements of a second tunnel between the local WAN edge router and the first WAN edge router, and one or more third measurements of a third tunnel between the first WAN edge router and the second WAN edge router. The network controllers can route the first traffic from the local WAN edge router to the first WAN optimizer via the second tunnel and the second traffic from the second WAN edge router to the first WAN optimizer via the third tunnel.

In some embodiments, the network controllers can determine there is no WAN optimizer local to the first host that has capacity to perform the one or more first WAN optimization services and the one or more first complementary WAN optimization services, and there is no WAN optimizer local to the second host that has capacity to perform the one or more second WAN optimization services and the one or more second complementary WAN optimization service. The network controllers can select the first WAN optimizer in a third LAN of the plurality of LANs (remote to the first host) and the second WAN optimizer in a fourth LAN of the plurality of LANs (remote to the second host) based on evaluation of one or more first measurements of a first tunnel between a first local WAN edge router local to the first host and a second local WAN edge router local to the second host, one or more second measurements of a second tunnel between the first local WAN edge router and the first WAN edge router, one or more third measurements of a third tunnel between the second local WAN edge router and the second WAN edge router, and one or more fourth measurements of a fourth tunnel between the first WAN edge router and the second WAN edge router. The network controllers can route the first traffic from the first local WAN edge router to the first WAN optimizer via the second tunnel and the second traffic from the second local WAN edge router to the second WAN optimizer via the third tunnel.

In some embodiments, the network controllers can determine there is no WAN optimizer local to the second host that has capacity to perform the one or more second WAN optimization services and the one or more second complementary WAN optimization services. The network controllers can provision the second WAN optimizer in the second LAN. In some embodiments, the one or more network controllers can determine there is no WAN optimizer local to the first host that has capacity to perform the one or more first WAN optimization services and the one or more first complementary WAN optimization services. The network controllers can provision the first WAN optimizer in the first LAN.

In some embodiments, the network controllers can receive one or more policies to perform the one or more first WAN optimization services and the one or more second complementary WAN optimization services for the first traffic and the one or more second WAN optimization services and the one or more first complementary WAN optimization services for the second traffic. In some embodiments, the network controllers can establish symmetry for the WAN optimized connection by applying one or more route policies to the first WAN edge router In some embodiments, at least one of the first WAN optimizer is in-line between the first host and the first WAN edge router or the second WAN optimizer is in-line between the second WAN edge router and the second host. That is, the first WAN optimizer can be physically deployed in between the first host and the first WAN edge router and/or the second WAN optimizer can be physically deployed in between the second host and the second host and the second WAN edge router. The first WAN optimizer can bridge traffic between the first host and the first WAN edge router and/or the second WAN optimizer can bridge traffic between the second host and the second WAN edge router. In some embodiments, at least one of the first WAN optimizer is off-path relative to a data path between the first host and the first WAN edge router or the second WAN optimizer is off-path relative to a data path between the second WAN edge router and the second host. That is, the first WAN optimizer can be deployed off of a data path between the first host and the first WAN edge router, and/or the second WAN optimizer can be deployed off of a data path between the second host and the second WAN optimizer. The first WAN optimizer can be configured to intercept certain traffic to perform the first WAN optimization services and the first complementary WAN optimization services, and/or the second WAN optimizer can be configured to intercept certain traffic to perform the second WAN optimization services and the second complementary WAN optimization services. Numerous other functions and advantages are described and suggested below as may be provided in accordance with the various embodiments.

Turning now to the drawings, FIG. 1 illustrates an example of a network environment 100 including a WAN fabric or overlay network that runs on top of one or more WAN transport networks 150 to interconnect geographically distributed LANs or sites 140. An example of an implementation of the WAN fabric is the Cisco® Software-Defined WAN (SD-WAN) platform. However, one of ordinary skill in the art will understand that, for the network environment 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

The WAN fabric can logically include an orchestration plane 102, a management plane 110, a control plane 120, and a data plane 130. In general, the orchestration plane 102 can assist in the automatic authentication and registration of the physical and/or virtual network devices of the overlay network. Conventional network devices are typically on-boarded manually through a Command Line Interface (CLI). An administrator of the conventional network must enter configuration information line by line into each network device, and enter operational commands one at a time into each network device in order to read and write status information. This method can be error prone and time consuming. In addition, configuration can be difficult when devices are in remote locations or when management ports are inaccessible. The orchestration plane 102 can improve upon conventional network on-boarding by enabling deployment of the WAN fabric as a whole, efficiently and easily, as opposed to a piecemeal approach that deals with individual network devices one at a time, and by automating much of the initialization of the fabric.

The orchestration plane 102 can include one or more physical or virtual WAN orchestrators 104. Although shown as distinct network appliances in this example, the WAN orchestrators 104 and the other network devices deployed in the network environment 100 may be integrated in various combinations in other embodiments. For example, one or more WAN orchestrators 104 can run on the same physical servers as one or more WAN management systems 112 and/or WAN fabric controllers 122 in some cases. In other cases, one or more WAN fabric controllers 122 may run on the same physical servers as one or more WAN edge routers 132, and so on. The WAN orchestrators 104 can authenticate the WAN management systems 112, the WAN fabric controllers 122, the WAN edge routers 132, and other network devices deployed in the network environment 100, and coordinate connectivity among them. The WAN orchestrators 104 can authenticate the network devices using certificates and cryptography (e.g., Diffie-Hellman (DH), Rivest-Shamir-Adleman (RSA), Elliptic Curve Cryptography (ECC), etc.), and establish connectivity among the devices using peer-to-peer techniques.

In some embodiments, the WAN orchestrators 104 can have public network addresses (e.g., IP addresses, DNS names, etc.) so that the WAN management systems 112, the WAN fabric controllers 122, the WAN edge routers 132, and other network devices deployed in the network environment 100 can connect to the orchestrators for on-boarding onto the overlay network. The WAN orchestrators 104 can coordinate the initial control connections among the WAN management systems 112, the WAN fabric controllers 122, WAN edge routers 132, and other network devices deployed in the network environment 100. For example, the WAN orchestrators 104 can create secure tunnels 106 (e.g., Datagram Transport Layer Security (DTLS), Transport Layer Security (TLS), etc.) to the WAN management systems 112 and to the WAN fabric controllers 122 and secure tunnels (not shown) to the WAN edge routers 132 and other network devices in the network environment 100 so that the devices can mutually authenticate each other. This authentication behavior can assure that only valid devices can participate in the overlay network. In some embodiments, the secure connections 106 between the WAN orchestrators 104 and the WAN management systems 112 and between the WAN orchestrators 104 and the WAN fabric controllers 122 can be persisted so that the orchestrators can inform the management systems and the controllers when new WAN edge routers 132 or other overlay network devices join the fabric. The secure connections with the WAN edge routers 132 can be temporary; once the WAN orchestrators 104 have matched an individual WAN edge router 132 with an individual WAN fabric controller 122, there may be no need for the orchestrators and the routers to communicate with one another. The WAN orchestrators 104 may share the information that is required for control plane connectivity, and instruct the WAN management systems 112, the WAN fabric controllers 122, the WAN edge routers 132, and other network devices deployed in the network environment 100 to initiate secure connectivity with one other.

To provide redundancy for the WAN orchestrators 104, multiple orchestrators can be deployed in the network environment 100, and different subsets of the WAN management systems 112, the WAN fabric controllers 122, the WAN edge routers 132, and other overlay network devices can point to different orchestrators. An individual WAN orchestrator 104 can maintain the secure connections 106 with multiple WAN fabric controllers 122. If one WAN orchestrator 104 becomes unavailable, the others can automatically and immediately sustain the functioning of the overlay network. In a deployment with multiple WAN fabric controllers 122, the WAN orchestrators 104 can pair an individual WAN edge router 132 with one of the controllers to provide load balancing. In some embodiments, one or more physical or virtual Cisco® SD-WAN vBond orchestrators can operate as the WAN orchestrators 104.

The management plane 110 can generally be responsible for central configuration and monitoring of the WAN fabric, among other tasks. The management plane 110 can include one or more physical or virtual WAN management systems 112. In some embodiments, the WAN management systems 112 can provide a dashboard to operate as a visual window for users into the network environment 100, and allow for configuration and administration of the WAN orchestrators 104, the WAN management systems 112, the WAN fabric controllers 122, the WAN edge routers 132, and other network devices deployed in the network environment 100. In some cases, the WAN management systems 112 can be situated in a centralized location, such as an organizational data center, co-location facility, cloud service provider network, and the like.

The WAN management systems 112 can also store certificate credentials, and create and store configuration information for the WAN management systems, the WAN fabric controllers 122, the WAN edge routers 132, and other network devices deployed in the network environment 100. As network devices of the overlay network come online, they can request their certificates and configuration information from the WAN management systems 112, and the management systems can push the certificates and configuration information to the requesting network devices. For cloud-based network devices, the WAN management systems 112 can also sign certificates and generate bootstrap configuration information, and decommission devices. In some embodiments, one or more physical or virtual Cisco® SD-WAN vManage Network Management Systems can operate as the WAN management systems 112.

The management plane 110 can also include an analytics engine 114 for providing visibility into the performance of applications and the network environment 100. The analytics engine 114 can provide graphical representations of the network environment 100, and enable an administrator to drill down to display the characteristics of an individual carrier or transport network 150, tunnel 106 or 124, application, or other element of the network environment 100 at a particular time. The analytics engine 114 can include a dashboard (e.g., stand-alone or integrated into the dashboard of the WAN management systems 112 or other systems) that can serve as an interactive overview of the network environment 100 and an entrance point into the state of the network at various levels of granularity. For example, the dashboard can display information for the last 24 hours (or other time period) by default, and enable an administrator to drill up or down to select different time periods for different data sets to display. The dashboard can display data for network availability, WAN performance by transport network 150, applications, and so forth. The analytics engine 114 can calculate application performance with virtual Quality of Experience (vQoE) values, which can be customized for individual applications. For example, the vQoE value can range from zero to ten, with zero being the worst performance and ten being the best. The analytics engine 114 can calculate vQoE based on latency, loss, and jitter, and other custom metrics for each application. The analytics engine 114 can offer insight into planning the network environment 100, and into its operational aspects, such as historical performance, forecasting, and so forth, to providing recommendations for optimizing the network. The analytics engine 114 can store months of data, apply machine learning algorithms, and provide unique insights and recommendations into the network environment 100.

Some of the features and functions implemented by the analytics engine 114 can include network and application visibility, forecasting, and what-if-scenario evaluation, among others. The analytics engine 114 can provide visibility into application and network performance based on information collected from the network environment 100 as well as correlated information from other networks. This can provide insight into top to bottom performing applications as well as anomalous applications over a period of time. For example, application performance visibility can include best and worst performing applications (e.g., displaying the best and worst performing applications and drilling down to details at the site level), most bandwidth consuming applications (e.g., displaying applications consuming the most bandwidth and drilling down to sites and users), and anomalous application families (e.g., displaying changes in bandwidth consumption over a period of time), among others. Network performance visibility can include network and circuit availability (e.g., displaying network availability and correlating network and circuit availability), health views of the transport networks 150 (e.g., displaying providers and their network characteristics), and best and worst performing tunnels 124 (e.g., displaying the best and worst performing tunnels and circuits and the providers on which they run), among others. Forecasting can help plan for the sites 140 that may need additional bandwidth in the next three to six months. What-if scenarios can help identify opportunities for balancing cost, performance, and availability of networks and applications. In some embodiments, one or more physical or virtual Cisco® SD-WAN vAnalytics appliances can operate as the analytics engine 114.

The control plane 120 can build and maintain the topology of the overlay network and make decisions on where traffic flows. The control plane 120 can work with the orchestration plane 102 and the management plane 110 to authenticate and register the WAN orchestrators 104, the WAN management systems 112, the WAN fabric controllers 122, the WAN edge routers 132, and other network devices deployed in the network environment 100, and to coordinate connectivity among the devices. The control plane 120 can include one or more physical or virtual WAN fabric controllers 122. The WAN fabric controllers 122 can oversee the control plane 120, establishing, adjusting, and maintaining the connections that form the fabric of the overlay network. Some of the functions and features implemented by the WAN fabric controllers 122 include secure control plane connectivity, Overlay Management Protocol (OMP), authentication, key reflection and rekeying, policy, and multiple configuration modes, among others.

An individual WAN fabric controller 122 can establish and maintain an individual secure control plane connection 124 (e.g., DTLS, TLS, etc.) with each other controller of the overlay network as well each individual WAN edge router 132 of the overlay network. In some deployments with multiple WAN fabric controllers 122, a single controller may have an individual secure connection 124 to each router of a subset of all of the WAN edge routers 132 of the WAN fabric for load-balancing purposes. The individual secure connection 124 can carry an encrypted payload between the individual WAN fabric controller 122 and another controller and between the controller and the individual WAN edge router 132. This payload can include route information for the WAN fabric controller 122 to determine the network topology, calculate the best routes to network destinations, and distribute the route information to the WAN edge routers 132 under the controller's administrative control (e.g., authenticated and registered by the controller). The secure connection 124 between an individual WAN fabric controller 122 and an individual WAN edge router 132 can be a persistent connection. In some embodiments, the WAN fabric controllers 122 may not have direct peering relationships with devices that the WAN edge routers 132 connect to on the service side or LAN-side of the routers.

OMP is a routing protocol similar to BGP in some respects that can be used to manage the WAN fabric. OMP can run inside the secure control plane connections 124, and carry the routes, next hops, keys, policy information, and the like, to establish and maintain the fabric. OMP can run between the WAN fabric controllers 122 and the WAN edge routers 132 over the secure connections 124 and, in some cases, may carry only control plane information. The WAN fabric controllers 122 can process the routes and advertise reachability information learned from these routes to other controllers and the WAN edge routers 132 forming the overlay network. OMP is discussed in greater detail below with respect to FIGS. 2A-2B and elsewhere in the present disclosure.

In some embodiments, the WAN fabric controllers 122 can have pre-installed, tamper-proof credentials that allow them to authenticate new controllers and new WAN edge routers 132 that come online. These credentials can ensure that only authenticated devices are allowed access to the overlay network. In addition, the WAN fabric controllers 122 can receive data plane keys from an individual WAN edge router 132, and reflect them to other routers to send data plane traffic. The WAN fabric controllers 122 may also operate a policy engine that can provide inbound and outbound policy constructs to manipulate routing information, access control, segmentation, extranets, and other network operations. The WAN fabric controllers 122 can also support various network configuration channels, such as Network Configuration Protocol (NETCONF)/Yet Another Next Generation (YANG) data modeling, Restful State Transfer (REST) on top of NETCONF/YANG (RESTCONF), Simple Network Management Protocol (SNMP), Syslog, Secure Shell (SSH)/Telnet, or other CLI, and so forth.

The WAN fabric controllers 122 can maintain a centralized route table that stores the route information that the controllers learn from the WAN edge routers 132 and from other controllers of the overlay network. Based on the configured policy, the WAN fabric controllers 122 can share this route information with the WAN edge routers 132 so that the routers can communicate with each other. During the initial startup of an individual WAN fabric controller 122, an administrator can enter minimal configuration information, such as the network addresses or other unique identifiers of the controller and the WAN orchestrators 104. For example, the identifiers can include IP addresses, MAC addresses, device serial numbers, hostnames, DNS names, labels or tags, and so forth. With this information and a root-of-trust public certificate, the individual WAN fabric controller 122 can authenticate itself within the overlay network, establish the secure connections 106 with the WAN orchestrators 104 and the secure connections 124 with other network devices in the network environment 100, and receive and activate its full configuration from the WAN management systems 112. The individual WAN fabric controller 122 can then begin participating in the overlay network.

To provide redundancy and high availability, the network environment 100 can include multiple WAN fabric controllers 122. To ensure that OMP routes remain synchronized, multiple WAN fabric controllers 122 can have the same configuration for policy and OMP. The configuration for device-specific information, such as interface locations and addresses, system identifiers, host names, and the like, can be different. In a deployment with redundant WAN fabric controllers 122, the WAN orchestrators 104 can identify an individual WAN fabric controller 122 to other controllers, and coordinate which of the controllers and which of the WAN edge routers 132 can accept connections to one another. Different WAN edge routers 132 in the same domain can connect to different WAN fabric controllers 122 for load balancing purposes. If one WAN fabric controller 122 becomes unavailable, the other controllers can automatically and immediately sustain the functioning of the overlay network. In some embodiments, one or more Cisco® SD-WAN vSmart controllers can operate as the WAN fabric controllers 122.

The data plane 130 can generally be responsible for forwarding packets based on decisions from the control plane 120. The data plane 130 can include the WAN edge routers 132, which can be physical or virtual network devices for routing and forwarding traffic (e.g., switches, routers, hubs, gateways, bridges, etc.). Some of the features and functions implemented by each WAN edge router 132 can include control plane connectivity (e.g., DTLS, TLS, etc.) over the secure connections 124, OMP, conventional control plane protocols (e.g., Open Shortest Path First (OSPF), Border Gateway Protocol (BGP), Virtual Router Redundancy Protocol (VRRP), Bidirectional Forwarding Detection (BFD), etc.), a Routing Information Base (RIB) (e.g., multiple route tables that can be populated automatically with direct interface routes, static routes, and dynamic routes learned via BGP, OSPF, etc.), a Forwarding Information Base (FIB) (e.g., a distilled version of the RIB that the router can use to forward packets), multiple network configuration channels (e.g., NETCONF, RESTCONF, SNMP, Syslog, SSH/Telnet, CLI, etc.), key management (e.g., symmetric keys used for secure communication with other routers), and data plane operations (e.g., IP forwarding, IP Security (IPSec), BFD, Quality of Service (QoS), Access Control Lists (ACLs), mirroring, policy-based forwarding, etc.), among others.

The WAN edge routers 132 can operate within various LANs or sites 140 associated with an organization, such as in one or more data centers 142, campus networks 144, branch offices 146, co-location facilities 148, and so forth, or in the cloud (e.g., Infrastructure as a Service (IaaS), Platform as a Service (PaaS), Software as a Service (SaaS), and other Cloud Service Provider (CSP) networks) (not shown). The WAN edge routers 132 can provide secure data plane connectivity (e.g., IPSec, Generic Routing Encapsulation (GRE), etc.) among the sites by establishing secure tunnels 134 with one another across one or more carrier or transport networks 150, such as the Internet 152 (e.g., Digital Subscriber Line (DSL), cable, etc.), MPLS network 154 (or other private packet-switched network (e.g., Metro Ethernet, Frame Relay, Asynchronous Transfer Mode (ATM), etc.), LTE network 156 (or other mobile networks (e.g., 3G, 4G, 5G, etc.)), or other WAN (e.g., SONET, SDH, Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.).

The WAN edge routers 132 can generally be responsible for traffic forwarding, security, encryption, quality of service (QoS), and conventional routing (e.g., BGP, OSPF, etc.), among other tasks. In some embodiments, physical or virtual Cisco® SD-WAN vEdge routers (sometimes also referred to as vEdges) or Cisco® Integrated Services Routers (ISRs), Cisco® Enterprise Network Convergence System (ENCS) routers, Cisco® Aggregation Services Routers (ASRs), and other Cisco® routers (sometimes referred to as cEdge routers or cEdges) can operate as the WAN edge routers 132.

Figure 2A:
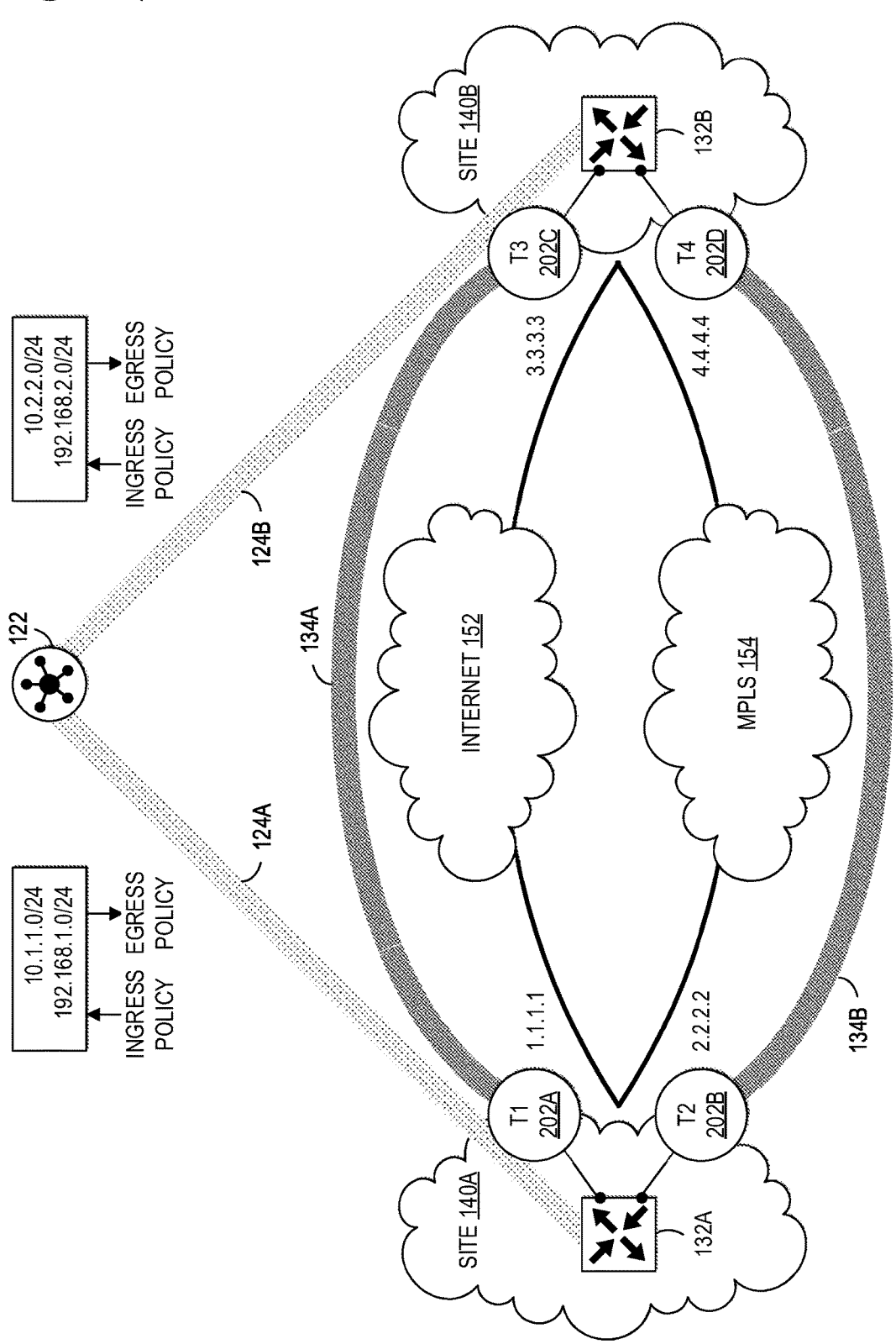
FIGS. 2A-2B illustrate examples of network environments for showing aspects of a control plane of a WAN fabric or overlay network in accordance with some embodiments.

FIG. 2A illustrates an example of a network environment 300 for showing aspects of a control plane of a WAN fabric or overlay network. In some embodiments, a network may run OMP as the control plane protocol to exchange routing, policy, and management information. In this example, the WAN fabric controller 122 and the WAN edge router 132A within site 140A can initiate a first OMP peering session using their respective system IP addresses (or other fixed identifiers) over a secure tunnel 124A (e.g., DTLS, TLS, etc.), and the WAN fabric controller 122 and the WAN edge router 132B can initiate a second OMP peering session using their respective system IP addresses over a secure tunnel 124B. OMP messages (e.g., control plane information, such as route prefixes, next-hop routes, crypto keys, policy information, etc.) may be transmitted back and forth between the WAN fabric controller 122 and the WAN edge routers 132A and 132B over the secure control plane connections 124A and 124B, respectively. The WAN fabric controller 122 can operate similarly to a route reflector. For example, the WAN fabric controller 122 can receive routes from the WAN edge routers 132, process and apply policies to them, and advertise routes to the routers. If there is no policy defined, the WAN edge routers 132 may behave in a manner similar to a full mesh topology, where each router can connect directly to another router at another site 140 and receive full routing information from each site.

At a high level, OMP is an information management and distribution protocol for deploying a WAN fabric or overlay network. OMP can separate network services or LAN-side traffic from transport or WAN-side traffic. Services provided in a virtual network environment can be located within a particular virtual network segment (e.g., a Virtual Local Area Networks (VLAN), Virtual Extensible LAN (VXLAN), Virtual Network Identifier (VNID), Virtual Routing and Forwarding (VRF) instance, Virtual Private Network (VPN), Cisco® Application-Centric Infrastructure (Cisco ACI™) Endpoint Group (EPG), Scalable Group Tags (SGT), etc.), and the services can be protected so that they are not visible outside that segment. In such a deployment, it can be a challenge to extend virtual network segments and service connectivity. OMP can address these scalability challenges by providing an efficient way to manage service traffic or LAN-side traffic based on the location of logical transport tunnel endpoints or Transport Locations (TLOCs) 202. This approach can extend the data plane and control plane separation concept within routers across the network environment 200. OMP can distribute control plane information, along with related policies. The WAN fabric controller 122 can make decisions related to routing and access policies for overlay routing, and propagate routing, security, services, and policies to the WAN edge routers 132 for data plane connectivity and transport. OMP, as implemented by the WAN edge routers 132 peering with the WAN fabric controller 122, can advertise to its peers the routes and services learned from its site 140 with their corresponding transport location mappings or TLOCs 202. Through OMP, the WAN fabric controller 122 can learn the topology of the overlay network and the services available in the network environment 200. OMP can also interact with conventional routing protocol (e.g., OSPF, BGP, etc.) running within the sites 140. For example, OMP can import routing information from the conventional routing protocols, and this routing information can provide reachability within the sites 140.

As OMP operates in an overlay networking environment, OMP routing peers can be different from routing peers in conventional networks. From a logical point of view, the overlay network can include the WAN fabric controller 122 and the WAN edge routers 132. An individual WAN edge router 132 can advertise its imported routes to the WAN fabric controller 122, and, based on policy decisions, the controller can distribute the overlay routing information to other routers of the fabric. In some cases, the WAN edge routers 132 do not advertise routing information to each other. Instead, the WAN fabric controller 122 and the WAN edge routers 132 can exchange control plane traffic via OMP peering sessions running over the secure tunnels 124.

When authenticated and registered by the WAN fabric controller 122, the WAN edge routers 132 can automatically collect routes from directly connected networks, as well as static routes and routes learned from Interior Gateway Protocol (IGP), BGP, and other conventional routing protocols. OMP can perform path selection, loop avoidance, and policy implementation on the WAN edge routers 132 to decide which routes are installed in the local routing table of the routers. OMP can advertise various types of routes, such as OMP routes, TLOC routes, and service routes, among others. OMP routes (sometimes referred to as vRoutes in Cisco® SD-WAN) can comprise prefixes that establish reachability between endpoints in the overlay network. For example, OMP routes can represent physical or virtual network appliances in a data center, network appliances at a branch office, or collections of physical or virtual hosts and other endpoints in the sites 140 of the overlay network. OMP routes can resolve into TLOCs for functional forwarding. In some cases, an OMP route can be similar to a prefix carried in BGP Address Family Identifier (AFI)/Subsequent AFI (SAFI) fields.

An OMP route can advertise various attributes, such as a TLOC 202, origin, originator, preference, service, site identifier, tag, and VPN, among others. The TLOC 202 can represent a transport location identifier of the next hop for the OMP route similar to a BGP next hop. The TLOC 202 can include a system IP address (or other fixed identifier) of the OMP-enabled device (e.g., the WAN edge router 132) that originates the OMP route, a color or label to identify the link type, and an encapsulation type of the transport tunnel 134, etc. The system IP address is a fixed system address of the OMP-enabled device itself. The reason for not using an assigned IP address or an interface IP address to denote the TLOC 202 is that these types of IP addresses can move or change. For example, these IP addresses can be assigned by Dynamic Host Configuration Protocol (DHCP), interface cards can be swapped, and so forth. Using the system IP address to identify the TLOC 202 can ensure that a transport termination point can be identified regardless of IP addressing. The color can represent the type of WAN interfaces on the WAN edge routers 132, such as default, 3g, biz-internet, blue, bronze, custom1, custom2, custom3, gold, green, lte, metro-ethernet, mpls, private1, private2, public-internet, red, and silver, among others. The encapsulation type can denote the encapsulation used on the tunnel interface (e.g., IPSec, GRE, etc.). The origin can represent a source of the OMP route, such as whether the route is a connected or directed route, static route, BGP route, OSPF route (inter-area, intra-area, and external), and so forth, and can include a metric associated with the original route. The originator can represent an OMP identifier of the originator of the route (e.g., an IP address from which the route was learned). The preference can represent a degree of preference for the OMP route (e.g., with a higher preference value indicating the route is more preferred). The service can represent a network service associated with the OMP route. The site identifier can represent an identifier of the site 140 within the overlay network to which the OMP route belongs. The tag can represent an optional, transitive path attribute that an OMP-enabled device can use to control the routing information it accepts, prefers, or distributes. The VPN can represent the VPN or other network segment (e.g., subnet, VLAN, VXLAN, VNID, VRF, EPG, SGT, etc.) to which the OMP route belongs. In some embodiments, the OMP route attributes (e.g., system IP, color, encapsulation type, carrier, preference, service, site identifier, VPN, etc.) can be configurable by provisioning control policy on the WAN fabric controller 122.

TLOC routes can tie an OMP route to a physical location in the overlay network that connects to a physical transport, such as the point at which the WAN interface connects to a carrier or transport network 150. In some embodiments, the TLOC 202 may be the only entity of the overlay network that is visible to the underlying network (e.g., physical network or underlay network), and may be reachable via conventional routing (e.g., BGP, OSPF, etc.) in the underlying network. For example, the TLOC 202 can be reachable via an entry in the routing table of the physical network, or it can be represented by a prefix residing on the outside of a Network Address Translation (NAT) device within the routing table. In some cases, the TLOC 202 can be similar to a BGP next hop.

As discussed above, the TLOC 202 can be represented by a 3-tuple including a system IP address of the OMP-enabled device, a color, and an encapsulation type. OMP can advertise the TLOCs 202 separately. TLOC routes can advertise various attributes, such as a private address (e.g., a private IP address of the interface associated with the TLOC 202), public address (e.g., a NAT-translated address of the TLOC 202), carrier (e.g., an identifier of the carrier type or the type of the transport network 150, which can also be used to indicate whether the transport network 150 is public or private), preference (e.g., a degree of preference that is used to differentiate between TLOCs that advertise the same OMP route), site identifier (e.g., an identifier of the site 140 within the overlay network to which the TLOC route belongs), tag (e.g., an optional, transitive path attribute that an OMP-enabled device can use to control the flow of routing information toward the TLOC 202; when an OMP route is advertised along with its TLOC 202, both or either can be distributed with a community tag, to be used to decide how send traffic to or receive traffic from a group of TLOCs), and weight (e.g., a value used to discriminate among multiple entry points if an OMP route is reachable through two or more TLOCs), among others.

Service routes can correspond to services provided by network appliances connected to the service-side or LAN-side of the WAN edge routers 132, and can tie an OMP route the network appliances. A service route can specify the location of the network appliance in the network environment 200 (e.g., the WAN edge router 132 or the site 140 in which the router resides). Some examples of services provided by the network appliances can include firewalls, Distributed Denial of Service (DDoS) mitigators, load balancers, Intrusion Detection and Prevention (IDP) systems, NATs, Application Delivery Controllers (ADCs), WAN optimizers, and other network devices that can transform, inspect, filter, or otherwise manipulate traffic for purposes other than packet forwarding. Service route information can be carried in both service and OMP routes. The WAN edge routers 132 can advertise services routes to the WAN fabric controller 122 using service address family Network Layer Reachability Information (NLRI).

In some embodiments, OMP can automatically redistribute connected, static, OSPF intra-area routes, and OSPF inter-area routes that it learns either locally or from its routing peers. To avoid routing loops and less than optimal routing, redistribution of BGP and OSPF external routes can require explicit configuration. To avoid propagating excessive routing information from the edge to the access portion of the network environment 200, the routes that the WAN edge routers 132 receive via OMP are not automatically redistributed into the conventional routing protocols running on the routers. Instead, redistribution of the routes received via OMP can be enabled locally on an individual WAN edge router 132. OMP can set the origin and sub-origin type (e.g., external or internal for BGP; external-1, external-2, intra-area, or inter-area for OSPF; etc.) in each OMP route to indicate the route's origin. When selecting routes, the WAN fabric controller 122 and the WAN edge routers 132 can take the origin type and subtype into consideration. OMP can also carry the metric of the original route. For example, a metric of 0 can indicate a connected route.

In some embodiments, OMP can use administrative distance as the measure to select the best path when there are two or more different routes to the same destination from multiple routing protocols. When OMP selects a particular route to a destination, it can prefer the one with the lower or lowest administrative distance value. Table 1 sets forth an example of the administrative distances used by the WAN fabric controller 122 and the WAN edge routers 132.

TABLE 1

Examples of Administrative Distances

| Type of Route or Protocol | Administrative Distance |
|---|---|
| Connected | 0 |
| Static | 1 |
| NAT | 1 |
| DHCP | 1 |
| GRE | 5 |
| External BGP (EBGP) | 20 |
| OSPF | 110 |
| Internal BGP (IBGP) | 200 |
| OMP | 250 |

In some embodiments, OMP can select the best route by first checking whether the OMP route is valid. If not, OMP can ignore it. If the OMP route is valid and if it has been learned from the same WAN fabric controller 122 or WAN edge router 132, OMP can select the OMP route with the lower administrative distance. If the administrative distances are equal, OMP can select the OMP route with the higher OMP route preference value. On the WAN edge routers 132, if the OMP route preference values are equal, OMP can select the OMP route with the higher TLOC preference value. If the TLOC preference values are equal, OMP can compare the origin type, and select the first match among connected, static, EBGP, OSPF intra-area, OSPF inter-area, OSPF external, IBGP, or unknown origin types. If the origin type is the same, OMP can select the OMP route that has the lower origin metric. On the WAN edge routers 132, if the origin types are the same, OMP can select the OMP route with the lower WAN edge router identifier. If the WAN edge router identifiers are equal, the WAN edge routers 132 can select the OMP route with the lower private IP address. If the WAN fabric controller 122 receives the same prefix from two different sites and if all attributes are equal, the WAN fabric controller 122 can choose both of them.

For example, the WAN fabric controller 122 can receive an OMP route to 10.10.10.0/24 via OMP from the WAN edge router 132A with an origin code of OSPF, and it can also receive the same route from another WAN fabric controller (not shown), also with an origin code of OSPF. If all other things are equal, the best-path is the route that came from the WAN edge router 132A. As another example, the WAN fabric controller 122 can learn the same OMP route, 10.10.10.0/24, from two WAN edge routers 132 in the same site 140. If all other parameters are the same, the WAN fabric controller 122 can select and advertise both routes to other OMP peers. The WAN edge routers 132 can install OMP routes in their FIBs if the TLOCs 202 to which they point to are active. For an individual TLOC 202 to be active, an active BFD session may be associated with that TLOC 202. The WAN edge routers 132 can establish separate BFD sessions with each remote TLOC 202. If a BFD session becomes inactive, the WAN fabric controller 122 can remove from the OMP routes that point to that TLOC from the FIBs. The WAN fabric controller 122 can run this algorithm on received paths and store the best paths in the winning order. The WAN fabric controller 122 can walk through this list and apply outbound policy on each. If a path is not rejected by the outbound policy, the WAN fabric controller 122 can advertise the path to it its peers. The WAN fabric controller 122 can advertise a configurable maximum for each prefix advertised to its peers.

In some embodiments, the WAN edge routers 132 can support graceful restart to allow the data plane in the overlay network to continue operating if the control plane stops functioning or becomes unavailable. If the WAN fabric controller 122 goes down, the WAN edge routers 132 can continue forwarding data traffic using the last known good information that they received from the controller. When the WAN fabric controller 122 is again available, the controller can re-establish the secure connections 124 to the WAN edge routers 132, and the routers can then receive updated, current network information from the controller. When the WAN fabric controller 122 and the WAN edge routers 132 enable graceful restart, the devices can cache the OMP information learned from each other as OMP peers. This information can include OMP routes, TLOC routes, service routes, IPSec Security Association (SA) parameters, and centralized data policies, among others. When one of the OMP peers is no longer available, the other peer can use the cached information to continue operating in the network environment 200. For example, when the WAN edge router 132A no longer detects the presence of the OMP connection 124A to the WAN fabric controller 122, the router can continue forwarding data traffic using cached OMP information. The WAN edge router 132A can also periodically check whether the WAN fabric controller 122 has again become available. When it does come back up and the WAN edge router 132A re-establishes the connection 124A with the WAN fabric controller, the router can flush its local cache and consider only the new OMP information from the controller to be valid and reliable. This same scenario can occur when the WAN fabric controller 122 no longer detects the presence of the WAN edge router 132A.

In addition to OMP running over the secure tunnels 124, this example shows the tunnel 134A (e.g., IPSec, GRE, etc.) established between TLOCs 202A and 202C across the Internet 152 and the tunnel 134B established between the TLOCs 202B and TLOC 202D over the MPLS network 154. Once the secure tunnels 134 are established, BFD can be enabled across each of them.

In some embodiments, network-wide segmentation can be implemented by defining network groupings (e.g., VLANs, VXLANs, VNIDs, VRFs, VPNs, EPGs, SGTs, etc.) at the edges of the network (e.g., the WAN edge routers 132), and carrying segmentation information in the packets for intermediate nodes to handle. For example, the WAN edge router 132A can subscribe to two VPNs, a "red" VPN corresponding to the prefix 10.1.1.0/24 (e.g., directly through a connected interface, learned via IGP), etc., and a "red" VPN corresponding to the prefix 10.2.2.0/24. The WAN edge router 132B can likewise subscribe to two VPNs, the red VPN, corresponding to the prefix 192.168.1.0/24, and the blue VPN, corresponding to the prefix 192.168.2.0/24. As the WAN edge routers 132 have OMP connections over the tunnels 124 to the WAN fabric controller 122, they can propagate their routing information to the WAN fabric controller 122. On the WAN fabric controller 122, an administrator can define policies to drop routes, change the TLOCs 202 for traffic engineering or service chaining, or change the VPN identifier. The administrator can apply these policies as inbound or outbound policies on the WAN fabric controller 122.

Prefixes belonging to a single VPN can be kept in a separate route table. This can provide L3 isolation for the various segments in the network environment 300. Thus, the WAN edge routers 132 can each have multiple VPN route tables. In addition, the WAN fabric controller 122 can maintain the VPN context of each prefix. Separate route tables can provide isolation on a single node. In some embodiments, VPN identifiers can be used to propagate routing information across the network environment 300. A VPN identifier carried in a packet can identify each VPN on a link. When a VPN is configured on a particular WAN edge router 132, the VPN can have a link color or label associated with it. The WAN edge router 132 can send the link color or label, along with the VPN identifier, to the WAN fabric controller 122. The WAN fabric controller 122 can propagate information mapping the WAN edge router 132 to the VPN identifier to other routers in the network environment 300. Remote WAN edge routers can use the link color or label to send traffic to the appropriate VPN. Local WAN edge routers, on receiving the data with the VPN identifier link color or label, can use the link color or label to de-multiplex data traffic. In this example, the transport networks that connect the WAN edge routers 132 may be unaware of the VPNs, the WAN edge routers 132 may VPN-aware, and the rest of the network can implement conventional routing.

In some embodiments, policy can be used to influence the flow of traffic among the WAN edge routers 132. Policy can be characterized as centralized or local. Centralized policy can be provisioned on the WAN fabric controller 122, and localized policy can be provisioned on the WAN edge routers 132, which may sit at the network edge between the sites 140 and a transport network, such as the Internet 152, the MPLS network 154, the LTE network 156, and so forth.

Policy can also be characterized as control or routing policy to affect the flow of routing information in the network's control plane, or data policy to affect the flow of data traffic in the network's data plane. Centralized control policy can apply to the network-wide routing of traffic by affecting the information that is stored in the master route table of the WAN fabric controller 122 and that is advertised to the WAN edge routers 132. The effects of centralized control policy can be seen in how the WAN edge routers 132 direct traffic to its destination. The centralized control policy configuration itself can remain on the WAN fabric controller 122 and not be pushed to the WAN edge routers 132.

When no centralized control policy is provisioned, all OMP routes can be placed in the master route table of the WAN fabric controller 122, and the controller can advertise all OMP routes to all of the WAN edge routers 132 in the same VPN or other virtual network segment. Provisioning centralized control policy can affect which OMP routes are placed in the master route table of the WAN fabric controller 122, what route information is advertised to the WAN edge routers 132, and whether the OMP routes are modified before being put into the master route table or before being advertised.

When centralized control policy is provisioned, the WAN fabric controller 122 can redistribute route information to the WAN edge routers 132 or modify the route information that is stored in the master route table of the controller or that is advertised by the controller. The WAN fabric controller 122 can activate the control policy by applying it to specific sites in the network environment 300 in either the inbound or the outbound direction. Applying a centralized control policy in the inbound direction can filter or modify the routes being advertised by the WAN edge routers 132 before they are placed in the master route table on the WAN fabric controller 122. As the first step in the process, routes can be accepted or rejected. Accepted routes can be installed in the master route table on the WAN fabric controller 122 either as received or as modified by the control policy. Routes that are rejected by a control policy can be silently discarded.

Applying a control policy in the outbound direction can filter or modify the routes that the WAN fabric controller 122 redistributes to the WAN edge routers 132. As the first step of an outbound policy, routes can either be accepted or rejected. For accepted routes, centralized control policy can modify the routes before they are distributed by the WAN fabric controller 122. Routes that are rejected by an outbound policy are not advertised.

The WAN edge routers 132 can place route information learned from the WAN fabric controller 122 into their local route tables for use when forwarding data traffic. As the WAN fabric controller 122 can operate as the centralized routing system in the network environment 300, the WAN edge routers 132 do not modify the OMP route information that they learn from the controller. Instead, the WAN fabric controller 122 can regularly receive OMP route advertisements from the WAN edge routers 132 and, after recalculating and updating the routing paths, the controller can advertise new routing information to the routers.

The centralized control policy provisioned on the WAN fabric controller 122 can remain on the controller and not be downloaded to the WAN edge routers 132. However, the routing decisions that result from centralized control policy can be passed to the WAN edge routers 132 in the form of route advertisements, and so the effect of the control policy can be reflected in how the routers direct data traffic to its destination.

Localized control policy can be provisioned locally on the WAN edge routers 132. Localized control policy can be similar to conventional routing policies, such as how BGP and OSPF routing behavior can be modified within a local site 140. Localized data policy can allow for provisioning and application of ACLs to a specific interface or interfaces on the WAN edge routers 132. Simple ACLs can permit and restrict access based on a 6-tuple match (e.g., source and destination IP addresses and ports, Differentiated Services Code Point (DSCP) fields, and protocol), in the same way as with centralized data policy. ACLs can also allow provisioning of class of service (CoS), policing, and mirroring, which can control how data traffic flows out of and into the interfaces and interface queues of the WAN edge routers 132.

Centralized data policy can apply to the flow of data traffic throughout the network environment 300. When no centralized data policy is provisioned, the prefixes within a particular network segment (e.g., VLAN, VXLAN, VNID, VRF, VPN, EPG, SGT, etc.) may be reachable from that segment. Provisioning centralized data policy can apply a 6-tuple filter that controls access between sources and destinations. As with centralized control policy, centralized data policy can be provisioned on the WAN fabric controller 122, and that configuration can remain on the WAN fabric controller 122. The effects of data policy can be reflected in how the WAN edge routers 132 direct data traffic to its destination. Unlike control policy, however, centralized data policies may be pushed to the WAN edge routers 132 in a read-only fashion.

In some embodiments, centralized data policies can be configured on the WAN fabric controller 122 using lists, policy definition (or policies), and policy application. Lists can define the targets of policy application or matching. Some examples of lists can include prefix lists (e.g., list of prefixes for use with policies), site lists (e.g., list of site identifiers for use in policy definitions and policy applications), TLOC lists (e.g., lists of TLOCs for use in policy definitions), and VPN lists (e.g., list of VPNs for use in policy) or lists of other virtual network segments (e.g., VLANs, VXLANs, VNIDs, VRFs, EPGs, SGTs, etc.). Policy definition (or policies) can control aspects of control and forwarding. Policy definition (or policies) can include different types of policies, such as control policies, data policies, and Zone-based Firewall (ZFW) policies (e.g., policies defining zones and controlling traffic between zones). Policy application can control what a policy is applied towards. Policy application can be site-oriented, and can be defined by the site-list.

Figure 2B:
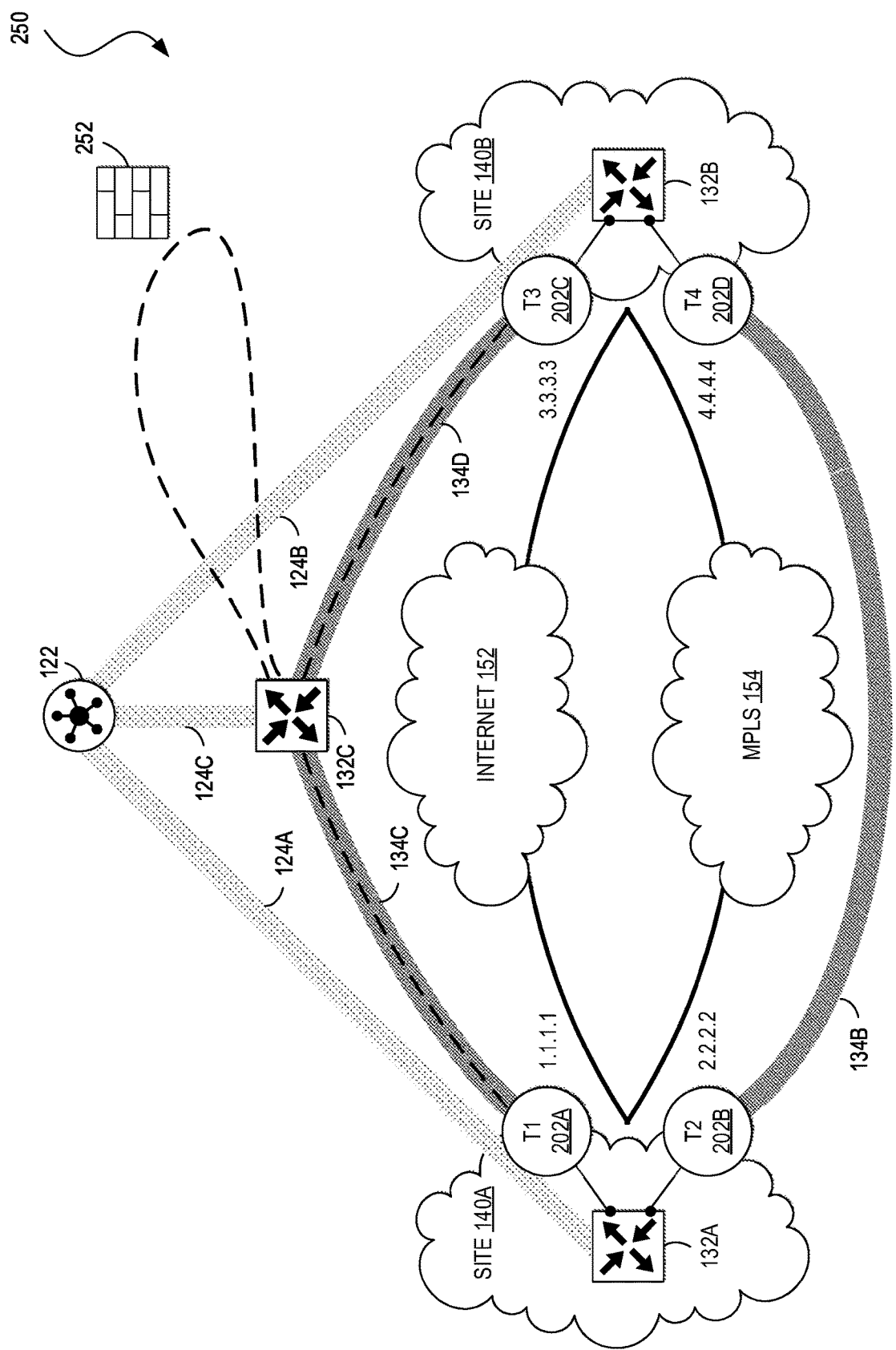

FIG. 2B illustrates a network environment 250 for showing aspects of service chaining in a WAN fabric overlay network. Service chaining can allow data traffic to be re-routed through one or more physical or virtual network appliances 252, such as firewalls, load balancers, IDPs, network flow monitors, WAN optimizers, and so forth. The network appliances 252 can be centralized physically in one location or may be distributed across several sites 140 for redundancy. The network appliances 252 can be internal, cloud-based, or external subscriptions. The WAN fabric controller 122 can reroute traffic from the sites 140 through the network appliances 252. In addition, the WAN fabric controller 122 can internally spawn or externally subscribe to new network appliances 252 on demand, such as for capacity, redundancy, best-of-breed preferences, and so forth. For example, if a firewall exceeds its capacity, the WAN fabric controller 122 can spawn a new instance of a firewall at a new location. As another example, a traffic flow can be re-routed through a service or chain of services for security. For instance, the WAN fabric controller 122 can reroute traffic flowing from a less secure region through a network appliance 252, such as a firewall, or through a chain of services to ensure that it has not been tampered with as it traverses the network environment 250. In another embodiment including a network comprising multiple VPNs each representing a different business function or organization, traffic can be rerouted between VPNs through a network appliance, such as a firewall, or through a chain of services (e.g., in a campus, inter-departmental traffic might go through a firewall, while intra-departmental traffic might be routed directly). In yet another embodiment, certain traffic flows may be rerouted through a specific network appliance, such as a load balancer.

Conventionally, the only way to re-route traffic flow is to provision every routing node—from the source to the service node to the systems beyond the service node—with a policy route. This can be done either by manually configuring each node or by using a provisioning tool that performs the configuration for each node. In either case, the process can be operationally complex to provision, maintain, and troubleshoot. In some embodiments, a network can instead enable and orchestrate service chaining from the WAN fabric controller 122 such that no configuration or provisioning may be required at the WAN edge routers 132. For example, the WAN edge routers 132 can advertise the network appliances 252 available in their sites 140 to the WAN fabric controller 122. Multiple WAN edge routers 132 may advertise the same network appliances 252. The WAN edge routers 132 can also advertise their OMP routes and TLOCs 202 to the WAN fabric controller 122. For traffic that requires the network appliances 252, policy on the WAN fabric controller 122 can change the next hop for the OMP routes to the landing points for the network appliances 252. In this manner, the traffic can first be processed by the network appliances 252 before being routed to its final destination.

In this example, the network environment 250 can include a WAN edge router 132C operating as a hub router to interconnect the WAN edge routers 132A and 132B. Although the WAN edge router 132C is shown as a distinct network device in this example, the WAN edge router 132C may run on the same physical server as the WAN fabric controller 122 and/or other network devices in other embodiments. A control policy can be defined that traffic from the WAN edge router 132A to the WAN edge router 132B travels through the WAN edge router 132C via the secure connection 134C (e.g., IPSec, GRE, etc.). Sitting behind the WAN edge router 132C is the network appliance 252 (e.g., a firewall, IDP, VPN gateway, etc.). If the control policy in the network environment 250 further dictates that traffic from the WAN edge router 132A to the WAN edge router 132B be processed by the network appliance 252, then the traffic from the WAN edge router 132A can first flow to the WAN edge router 132C. Upon receiving the traffic from the WAN edge router 132A, the WAN edge router 132C can redirect the traffic to the network appliance 252. The network appliance 252 can process the traffic and return cleared traffic to the WAN edge router 132C. Finally, the WAN edge router 132C can forward the traffic to the WAN edge router 132B via the secure connection 134D.

The WAN edge routers 132 can advertise the network appliances 252 available in their sites 140 to the WAN fabric controller 122 using service routes. For example, the service routes can be sent via OMP over the secure connections 124 using the service route Subsequent Address Family Identifier (SAFI) bits of the OMP NLRI. The WAN fabric controller 122 can maintain the service routes in its RIB. In some cases, the WAN fabric controller 122 does not propagate these routes to the WAN edge routers 132. Instead, the service route SAFI can include a VPN identifier (or other virtual network segment identifier) to identify the VPN (or other virtual network segment) to which the network appliance 252 belongs, a service identifier to identify the type of network appliance 252 (e.g., firewall, IDP, network flow monitor, WAN optimizer, etc.), a label that the WAN fabric controller 122 can use to replace in the OMP route in order to direct the traffic to that network appliance, an originator identifier or IP address of the network appliance, a TLOC of the WAN edge router that is "hosting" the network appliance, and a path identifier of the OMP path. To route traffic through the network appliance 252, a control policy (e.g., including match criteria based on a destination prefix or its attributes) or a data policy (e.g., including the source address, source port, DSCP value, destination port of the packet or traffic flow, etc.) can be provisioned on the WAN fabric controller 122. The WAN fabric controller 122 can maintain OMP routes, TLOC routes, and service routes in its route table. An individual OMP route can carry a TLOC 202 and the label associated with it. On the WAN fabric controller 122, a policy can be applied that changes the TLOC 202 and its associated label to be that of the network appliance 252.

Figure 3:
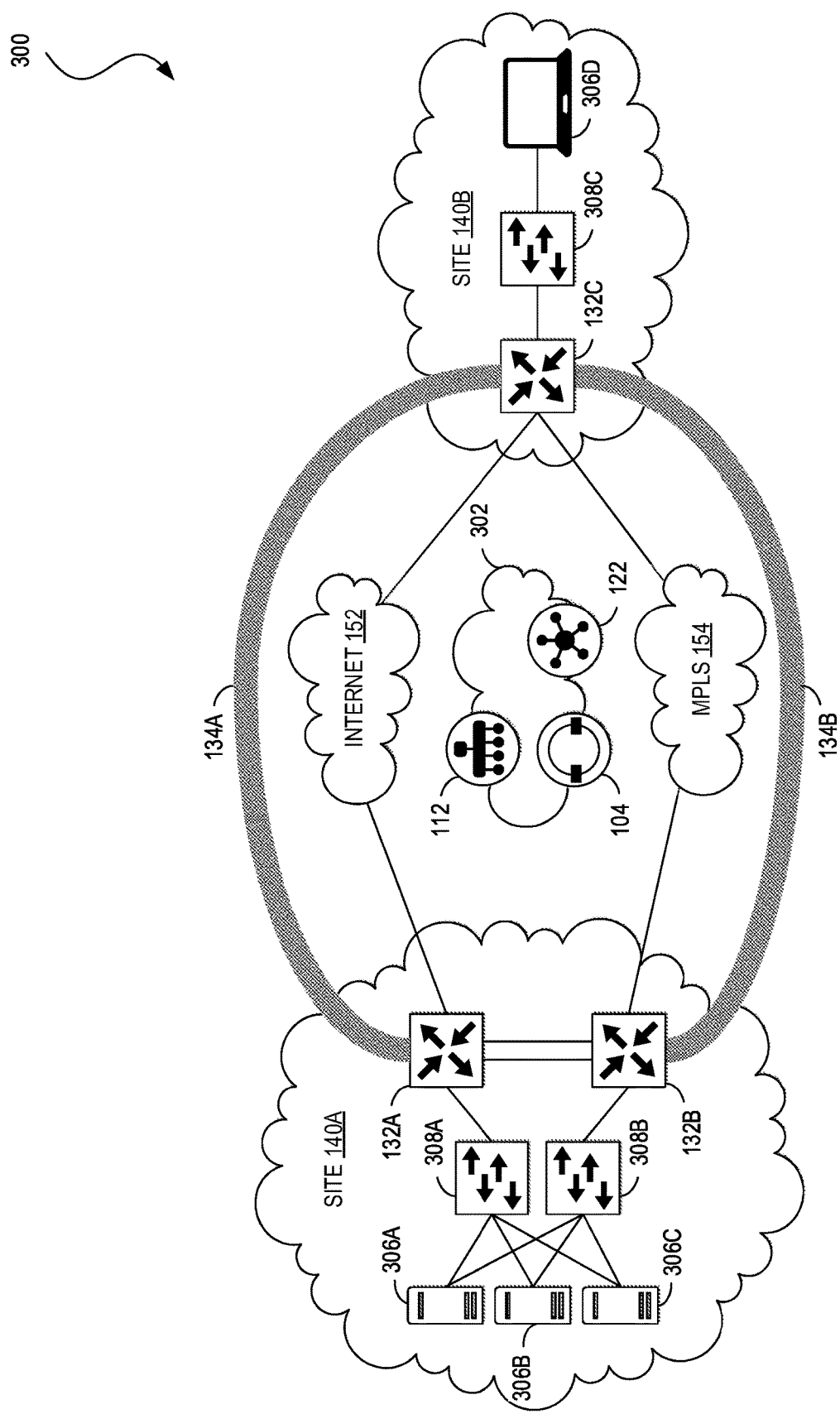
FIG. 3 illustrates an example of a network environment for showing aspects of a data plane of a WAN fabric or overlay network in accordance with an embodiment.

FIG. 3 illustrates an example of a network environment 300 for showing aspects of a data plane of a WAN fabric or overlay network. The network environment 300 can include a management network 302, sites 140A and 140B (collectively, 140), and multiple transport networks 150, such as the Internet 152 and the MPLS network 154. The management network 302 can utilize various deployment models, including within an organizational data center, a co-location facility, a cloud service provider network, or different combinations of these sites 140. The management network 302 can include one or more WAN orchestrators 104, WAN management systems 112, and WAN fabric controllers 122. Although the management network 302 is shown as a single network in this example, one of ordinary skill in the art will understand that each physical or virtual device of the management network 302 can be distributed across any number of networks and/or be co-located with the sites 140. In this example, each physical or virtual network device of the management network 302 can be reached through either the Internet 152 or the MPLS network 154.

The sites 140 can comprise L2 and/or L3 LANs (e.g., the data center 142, the campus network 144, the branch office network 146, the co-location facility 148, a cloud service provider network, etc.). The sites 140 can include one or more hosts 306A-306D (collectively, 206) (sometimes also referred to as endpoints, computing devices, computing systems, user devices, clients, servers, etc.) connected to one or more network devices 308A-308C (e.g., switches, routers, hubs, gateways, bridges, etc.) (sometimes referred to as fabric edge nodes in Cisco® Software-Defined Access (SD-Access), border leafs in Cisco® Application Centric Infrastructure (Cisco ACI™), WAN aggregation devices, Customer Edge (CE) devices, service-side or LAN-side switches in Cisco® SD-WAN, etc.) (collectively, 308).

The hosts 306 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The hosts 306 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, Heating, Ventilation, and Air Conditioning (HVAC) equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identifier (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The network devices 308 can include physical or virtual switches, routers, hubs, gateways, bridges, and other network devices for routing and forwarding traffic. Although the site 140A is shown including a pair of network devices 308A and 308B and a pair of WAN edge routers 132A and 132B, and the site 140B is shown including a single access device 308C and a single WAN edge router 132C in this example, the sites 140 can generally comprise any number of network devices in any network topology, including multi-tier (e.g., core, distribution or aggregation, and access tiers), spine-and-leaf, mesh, tree, bus, hub and spoke, and so forth. For example, in some embodiments, one or more data centers or sites may implement the Cisco ACI™ architecture, one or more campus networks or sites may implement the Cisco® SD-Access architecture, one or more branch networks may implement the Cisco® SD-Branch architecture, and so forth. In this example, the network devices 308 can operate as WAN aggregation devices to connect nodes local to the sites 140, such as the hosts 306 and other network devices (not shown), to the WAN edge routers 132.

The WAN edge routers 132 can directly connect to the Internet 152 and the MPLS network 154 via network devices (sometimes referred to as Provider Edge (PE) routers) (not shown) in these transport networks. The WAN edge routers 132 can form secure control plane connections (e.g., DTLS, TLS, etc.) (not shown) to the WAN fabric controller 122. The WAN edge routers 132A and 132C can also securely connect to one another via a data tunnel 134A (e.g., IPSec, GRE, etc.) over the Internet 152, and the WAN edge routers 132B and 132C can securely connect to one another via a data tunnel 134B over the MPLS network 154. The WAN edge routers 132 can run BFD over the tunnels 134A and 134B (collectively, 134) for detecting loss, latency, jitter, path failures, and so on. BFD is a protocol that can provide a low-overhead, short-duration method of monitoring the performance and health of the tunnels 134. The WAN fabric controller 122 and the WAN edge routers 132 can use BFD to probe and measure the performance and health of the secure tunnels 134. The WAN fabric controller 122 can determine the best performing path based on the result of BFD probes, giving information about latency, jitter, and loss for each of the tunnels 134. In addition, the WAN fabric controller 122 and the WAN edge routers 132 can determine failure of the tunnels 134 from the BFD probes. If one of the WAN edge routers 132 is the reason for the failure, the WAN fabric controller can reroute traffic to avoid the disconnected router until the router recovers. If the WAN fabric controller 122 is the reason for the failure, the WAN edge routers 132 may failover to a different controller until the controller recovers.

Figure 4:
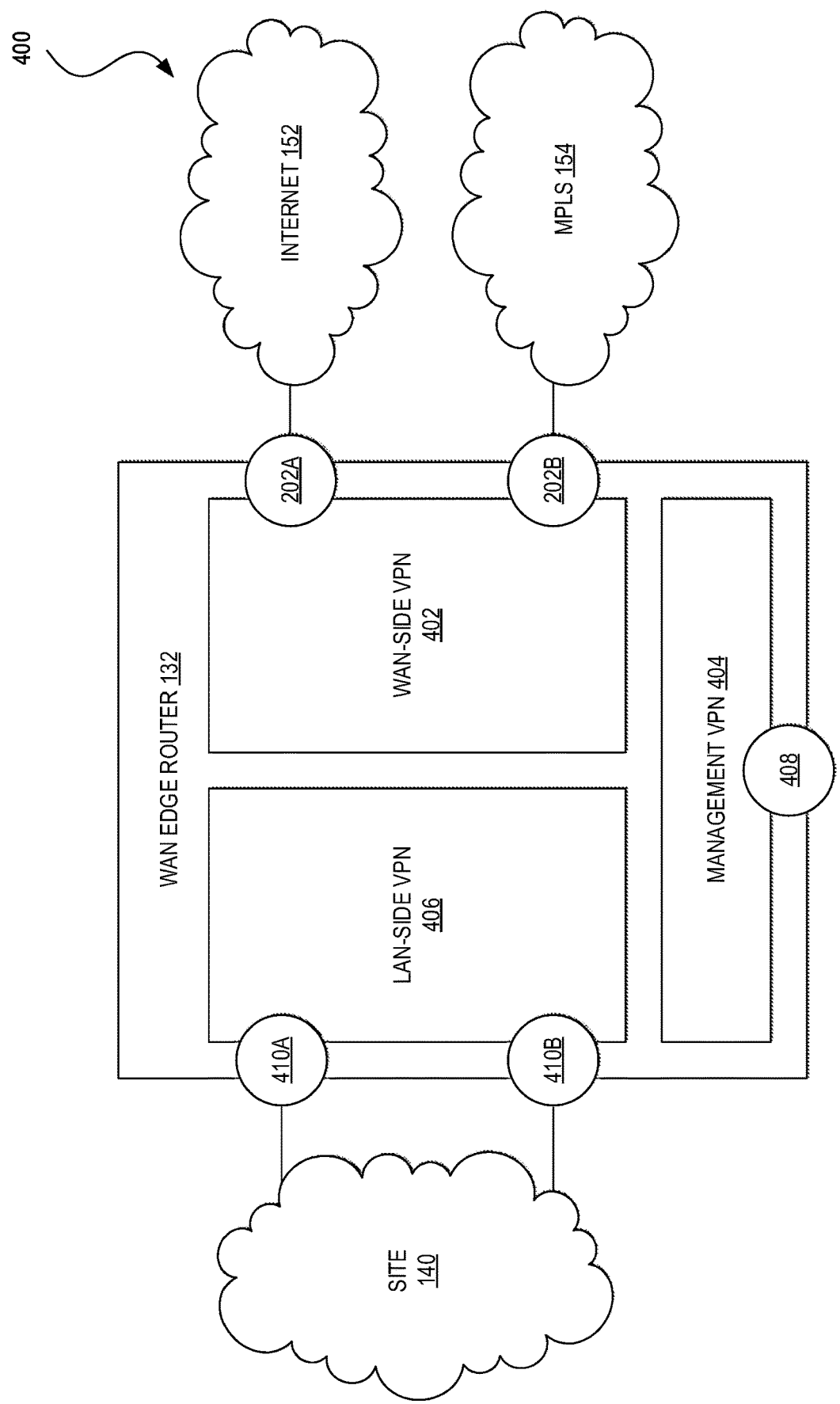
FIG. 4 illustrates an example of network environment for showing an approach to segment a WAN fabric or overlay network in accordance with an embodiment.

FIG. 4 illustrates an example of a network environment 400 for showing aspects of network segmentation of a WAN fabric or overlay network. In this example, the WAN fabric uses VPNs for network segmentation but one of ordinary skill in the art will understand that other embodiments may alternatively or additionally use other virtual network segmenting technologies, such as VLANs, VXLANs, VNIDs, VRFs, EPGs, SGTs, and so on. In general, VPNs can be isolated from one another and can have their own forwarding tables. An interface or sub-interface can be configured under a single VPN and may not be part of more than one VPN. Labels may be used in OMP route attributes and in packet encapsulation, which can identify the VPN to which a packet belongs. The VPN number can be a four-byte integer with a value from 0 to 65530. In some embodiments, each WAN edge router 132 can include a WAN-side VPN 402 (sometimes referred to as a transport VPN) (e.g., VPN number zero), a management VPN 404 (e.g., VPN number five-hundred twelve), and one or more LAN-side VPNs 406 (sometimes referred to as service VPNs). The WAN-side VPN 402 can include one or more physical or virtual network interfaces (e.g., Gigabit Ethernet network interfaces corresponding to the TLOCs 202A and 202B) that connect to one or more transport networks, such as the Internet 152 and the MPLS network 154. Secure connections (e.g., DTLS, TLS, etc.) between the network devices of the WAN fabric, such as between the WAN orchestrators 104 and the WAN edge routers 132, the WAN fabric controllers 122 and the WAN edge routers 132, and so forth, can be initiated from the WAN-side VPN 402. In addition, static or default routes or a dynamic routing protocol can be configured inside the WAN-side VPN 402 to get appropriate next-hop information so that the control plane 120 may be established and the secure data tunnels 134 (e.g., IPSec, GRE, etc.) (not shown) can connect to remote sites 140.

The management VPN 404 can carry out-of-band management traffic to and from the WAN orchestrators 104, WAN management systems 112, WAN fabric controllers 122, and/or WAN edge routers 132 over a management network interface 408. In some embodiments, the management VPN 404 may not be carried across the WAN fabric.

The LAN-side VPN 406 can include one or more physical or virtual network interfaces 408A and 408B (e.g., Gigabit Ethernet network interfaces) (collectively, 408) that connect to one or more local sites 140 (i.e., local relative to the WAN edge router 132) and carry data traffic. The LAN-side VPN 406 can be configured to provide features such as OSPF or BGP, VRRP, QoS, traffic shaping, policing, and so forth. In some embodiments, data traffic can be directed over the secure tunnels 134 to other sites by redistributing OMP routes received from the WAN fabric controllers 122 at the site 140 into the routing protocol configured for the LAN-side VPN 406. In turn, routes from the site 140 can be advertised to other sites by advertising the LAN-side VPN routes into OMP by sending the LAN-side routes to the WAN fabric controllers 122. The WAN fabric controllers 122 can redistribute the LAN-side routes to other WAN edge routers 132 in the network environment 400.

The WAN fabric or overlay network discussed above with respect to FIGS. 1-4 can enable an organization to increase network capacity over a WAN in a relatively inexpensive manner by carrying WAN traffic over the Internet 152, LTE networks 156, and so forth, instead of MPLS networks 154 exclusively. This approach can significantly reduce or even eliminate network performance problems associated with loss, latency, jitter, and other issues with WAN connectivity. However, many important use cases remain for WAN optimization. For example, WAN optimization can still be critical for large data transfers over long distances where bandwidth is not a limiting factor and network performance may be instead be limited by the time it takes to send and receive data packets over a great distance and the number of times data must be retransmitted. In addition, WAN optimization can be effective for providing branch sites with direct connectivity to the Internet, CSP networks, and the like, to eliminate back-hauling of traffic through a central site.

WAN optimizers can operate to provide certain network services (e.g., de-duplication, compression, transport flow optimization, application acceleration, caching, etc.) for traffic between branch sites and regional hubs, co-location facilities, CSP networks, and so forth when the WAN optimizers have corresponding capabilities and capacity. Conventional networks can depend on TCP auto discovery to enable the WAN optimizers to identify each other and to negotiate the optimizations to perform on traffic between the sites. Conventional TCP auto discovery defines a protocol for establishing connections between peer WAN optimizers. The conventional protocol adds a small amount of data within the TCP options (e.g., TCP option number 33 or hex 0x21) of the Synchronization (SYN), SYN/Acknowledgment (ACK), and ACK messages of TCP's three-way handshake. The conventional TCP auto discovery option can enable peer WAN optimizers to identify one another across the WAN, and to negotiate which optimization policies the WAN optimizers may employ for the TCP connection. Some firewalls, IDPs, and other security network devices prohibit TCP options that are not officially registered with the Internet Assigned Numbers Authority (IANA), and may strip these options such that TCP auto discovery fails.

Another issue that can arise with conventional TCP auto discovery is that, at the end of auto discovery, some WAN optimizers may shift the TCP sequence numbers in the packets between them by a specified amount (e.g., by 2 Gigabytes (GB)) to mark the optimized segment of the connection. This enables the WAN optimizers to differentiate between optimized traffic and unoptimized traffic, and to gracefully handle when one or both peer WAN optimizers become inaccessible (e.g., due to a network failure, failure of a WAN optimizer, insufficient capacity of a WAN optimizer, etc.). However, this behavior can cause some firewalls, IDPs, and other network security appliances along the path between the WAN optimizers to treat the traffic as suspicious, drop the traffic, and reset the TCP session. One conventional approach to resolve this issue is to manually configure static routes between hosts but this strategy is not scalable in modern enterprise networks. Another conventional approach is to establish tunnels through the network security to allow optimization traffic through the tunnels. However, this approach and renders existing security policies ineffective because optimized traffic is obfuscated. Further, stateful inspection performed on this traffic is performed against the tunnel packets and not against the original flow.

Another challenge faced by conventional networks in implementing WAN optimization is asymmetric routing. Asymmetric routing can occur when traffic does not traverse the same path in both directions of a connection. That is, the traffic may traverse from a source to a destination in one path but the return traffic takes a different path from the destination back to the source. This can occur because the routing protocol on each end selects a different path (e.g., by load balancing, session balancing, path optimization, etc.). Asymmetric routing can cause problems with firewalls, IDPs, network flow monitors, WAN optimizers, and other network appliances. For example, WAN optimization can fail if the return traffic bypasses one or both WAN optimizers. Firewalls, IDPs, and other network security appliances that receive traffic from one of the end of the network expect to see return traffic from the other end and may drop traffic not exhibiting this behavior.

Systems and methods of various embodiments can address the above and other deficiencies of prior art approaches to WAN optimization. One or more network controllers (e.g., the WAN orchestrators 104, the WAN management systems 112, the WAN fabric controllers 122, etc.) can have administrative control over a plurality of WAN edge routers each located in a plurality of LANs dispersed across one or more WANs or transport networks via authentication and registration of the routers. The WAN edge routers can identify WAN optimizers within their LANs or local sites, and advertise these routes to the network controllers (e.g., over OMP). The WAN edge routers 132 can facilitate authentication and registration of the WAN optimizers by the network controllers. The network controllers and the WAN optimizers can continuously exchange information regarding the health and performance (e.g., connection capacity, flow latency, number of flows, etc.) of the WAN optimizers and/or the health and performance (e.g., loss, latency, jitter, etc.) of the connections between the WAN edge routers 132 and the WAN optimizers. When a WAN optimizer receives a request from a client to connect to a server, the WAN optimizer can query the WAN edge router 132 in its site 140 to identify a peer WAN optimizer that is proximate to the server (e.g., lower or lowest administrative distance) and that has the capacity or resources to optimize traffic between the client and the server. The WAN edge router 132 can in turn query the network controllers to identify a suitable peer WAN optimizer, and the network controllers can configure the overlay network to route traffic from the WAN optimizer to a selected peer WAN optimizer. In other words, the network controllers can perform auto discovery on behalf of the WAN optimizers without having to alter packet headers (e.g., writing data to TCP options). An additional advantage of this approach is that the network controllers can enable WAN optimization for sites that do not have WAN optimization capacity by rerouting traffic through sites that do have WAN optimization capacity before delivering traffic to its ultimate destination. In network deployments where there are firewalls, IDPs, and other network security appliances that drop traffic whose sequence numbers are outside of a specified range in the path between a set of peer WAN optimizers, the network controllers can provision new instances of the network security appliances capable of handling such traffic and reroute the traffic through the newly provisioned network security appliances. In some embodiments, the network controllers can also provision WAN optimizers in sites lacking WAN optimization capacity.

Figure 5:
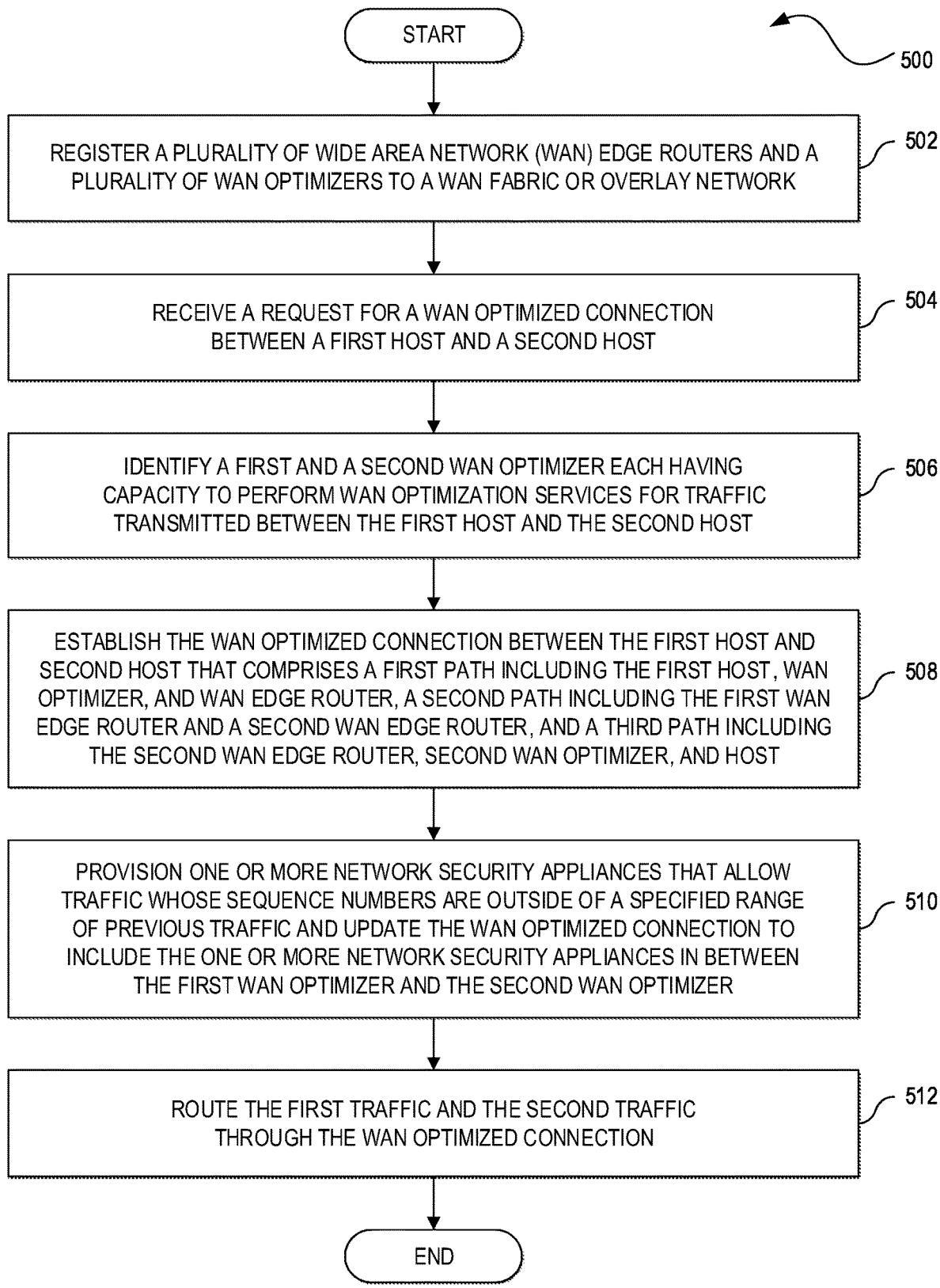
FIG. 5 illustrates an example of a process for improving WAN optimization in a WAN fabric or overlay network in accordance with an embodiment.

FIG. 5 illustrates an example of a process 500 for enabling WAN optimization in a WAN fabric or overlay network. One of ordinary skill will understood that, for any processes discussed herein, there can be additional, fewer, or alternative steps performed in similar or alternative orders, or in parallel, within the scope of the various embodiments unless otherwise stated. The process 500 can be performed at least in part by one or more network orchestrators (e.g., the WAN orchestrators 104), network management systems (e.g., the WAN management systems 112), network controllers (e.g., the WAN fabric controllers 122, a WAN optimization controller 602, an NFV orchestrator 802, etc.), and network devices (e.g., the WAN edge routers 132, the network devices 308, the network appliances 252, WAN optimizers 604, etc.), among other elements discussed throughout the present disclosure.

The process 500 can begin at step 502 in which one or more network controllers (e.g., the WAN orchestrators 104, the WAN management systems 112, the WAN fabric controller 122, the WAN optimization controller 602, the NFV orchestrator 802, etc.) can register a plurality of WAN edge routers (e.g., the WAN edge routers 132) and a plurality of WAN optimizers (e.g., the WAN optimizers 604) within a plurality of LANs (e.g., the sites 140). In some embodiments, a WAN fabric can implement a zero trust security model in the control plane to ensure that the elements of the fabric are authenticated and authorized prior to admittance into the overlay network. In some cases, this model can establish the identity of each network device of the WAN fabric using digital certificates. The certificates can be used to create secure control channels (e.g., the secure control channels 124) between the network controllers and the WAN edge routers. Once built, protocols (e.g., OMP, NETCONF, etc.) can run over the secure control channels to enable the network controllers to authenticate and register the WAN edge routers, the WAN optimizers, and other network devices of the overlay network.

In some embodiments, when an individual WAN edge router is first deployed, it can establish a secure connection (e.g., DTLS, TLS, etc.) with a WAN management system (e.g., the WAN management system 112) so that the router can receive its full configuration. Then, the WAN edge router can establish a secure connection (e.g., DTLS, TLS, etc.) with a WAN fabric controller (e.g., the WAN fabric controller 122) to begin participating in the overlay network. In some embodiments, the WAN edge router can automatically discover the WAN management system and the WAN fabric controller with the help of a WAN orchestrator (e.g., the WAN orchestrator 104). The initial or factory default configuration on the WAN edge router can include the orchestrator's IP address, Domain Name System (DNS) name, or other identifier. The WAN edge router can use this information to establish a secure connection (e.g., DTLS, TLS, etc.) with the WAN orchestrator so that the devices can authenticate one another over the connection.

When mutual authentication between the WAN orchestrator and the WAN edge router completes successfully, the orchestrator can transmit to the router the IP addresses, serial numbers, and/or other identifiers of the WAN management system and the WAN fabric controller. The IP addresses can be public IP addresses, or they may be a list of public and private IP addresses and port numbers if the devices are behind a NAT gateway. The WAN orchestrator can also transmit to the WAN fabric controller a request to authorize and register the WAN edge router to the fabric, and, if the router is behind a NAT gateway, to initiate a session with the router. After receiving the on-boarding information to the WAN management system and the WAN fabric controller from the WAN orchestrator, the WAN edge router can tear down its connection with the orchestrator.

To receive its full configuration from the WAN management system, the WAN edge router can initiate a secure connection (e.g., DTLS, TLS, etc.) to the public IP address (or other identifier) of the management system. For example, the connection may be encrypted using RSA (or other suitable encryption technology). The WAN edge router and the WAN management system can each automatically generate an RSA private key-public key pair when each device boots. The WAN management system can receive the original interface address of the WAN edge router, and use the outer IP address in the received packet to determine whether the router is behind a NAT. If so, the WAN management system can create a mapping of the public IP address and port of the WAN edge router to the router's private IP address.

The WAN edge router and the WAN management system can authenticate one another over the encrypted channel in parallel. For example, the WAN management system can transmit its trusted root Certificate Authority (CA) signed certificate to the WAN edge router. The WAN edge router can use its chain of trust to extract the organization name from the certificate and compare it to the organization name configured on the router itself. If the two organization names match, the WAN edge router knows that the organization of the WAN management system is proper. If they do not match, the WAN edge router can tear down the connection with the WAN management system. The WAN edge router can use the root CA chain to verify that the certificate has been signed by the root CA. If the signature is correct, the WAN edge router knows that the certificate itself is valid. If the signature is incorrect, the WAN edge router can tear down the connection with the WAN management system.

In the other direction, the WAN management system can send a challenge (e.g., a 256-bit random value) to the WAN edge router. The WAN edge router can send a response to the challenge that may include its serial number, chassis number, board identifier certificate (for a physical router) or a signed certificate (for a virtual router), and the 256-bit random value signed using the router's private key. The WAN management system can compare the serial and chassis numbers to a list of authorized WAN edge routers to ensure they match, and check that the signing of the 256-bit random value is proper based on the WAN edge router's public key (e.g., extracted from the board identifier certificate or signed certificate included within the challenge response). If the serial, chassis, or 256-bit random numbers do not match, the WAN management system can tear down the secure connection. The WAN management system can use the root CA chain from the WAN edge router's board identifier certificate or signed certificate to validate the certificate itself is valid. If the certificate is not valid, the WAN management system can tear down the secure connection. When the two-way authentication succeeds, the WAN management system can transmit the full configuration file to the WAN edge router over the secure connection. After the WAN edge router activates its full configuration, the router can begin advertising prefixes to the WAN fabric controller.

The WAN fabric controller and the WAN edge router can also mutually authenticate one another using a similar two-way authentication process as the one performed between the WAN management system and the WAN edge router discussed above. When mutual authentication completes, the secure connection (e.g., DTLS, TLS, etc.) between the WAN fabric controller and the WAN edge router can be persisted, and the controller can establish an OMP peering session with the router over the secure connection. Over the OMP session, the WAN edge router can relay various control plane-related information to the WAN fabric controller 122 so that the controller can learn the network topology. This information can include the service-side or LAN-side prefixes and routes that the WAN edge router has learned from local static and dynamic routing (e.g., BGP, OSPF, etc.), the router's transport address or TLOC, and the network addresses or other identifiers of physical or virtual network appliances located on the router's service-side or LAN-side network, including firewalls, load balancers, IDPs, NATs, ADCs, WAN optimizers, and other network devices that can transform, inspect, filter, or otherwise manipulate traffic for purposes other than packet forwarding. The WAN fabric controller can install the OMP routes in its routing database and advertise them to other WAN edge routers in the overlay network. The WAN fabric controller can also update the WAN edge router with the OMP route information that it learns from other WAN edge routers in the fabric. For example, the WAN fabric controller can apply inbound policy on received routes and prefixes before installing them into its routing table, and it can apply outbound policy before advertising routes from its routing table.

In some embodiments, before the WAN edge router can exchange data traffic with other WAN edge routers, peering routers can establish a secure connection (e.g., IPSec, GRE, etc.) (e.g., the secure connection 134) between them to authenticate one another with the exchange of keys. In a conventional network, key exchange may be handled by the Internet Key Exchange (IKE) protocol or other symmetric key exchange system. IKE first sets up secure communications channels between devices and then establishes SAs between each pair of devices that want to exchange data. IKE uses a Diffie-Hellman key exchange algorithm to generate a shared key that encrypts further IKE communication. To establish SAs, each device exchanges keys with every other device in the network and creates per-pair keys, generating a unique key for each remote device. This means that in a fully meshed network of n devices, each device may be required to manage $n^2$ key exchanges and (n−1) keys. For example, in a 1,000-node network, 1,000,000 key exchanges may be required for authentication, and an individual network device can be responsible for maintaining and managing up to 999 keys. This approach is untenable for large networks, and IKE can become a bottleneck in starting and maintaining data exchange. The hand-shaking and the processing for the key change required in the conventional network to set up communications channels can be both time-consuming and resource-intensive.

In some embodiments, the WAN edge routers can establish SAs to provide mutual authentication and encryption without IKE. Instead, to provide a scalable solution for key exchange, the WAN edge routers can take advantage of the existing secure control plane connections maintained by the WAN fabric controller. As the secure control plane connections are authenticated, encrypted, and tamper-proof, there may be no need in the data plane to set up secure communications channels to perform data plane authentication between the WAN edge routers. In some embodiments, data plane encryption and key generation can be performed using Advanced Encryption Standard (AES) 256, a symmetric-key algorithm that uses the same key to encrypt outgoing packets and to decrypt incoming packets. For example, an individual WAN edge router can periodically generate an AES key for its data path (e.g., one key per TLOC) and transmit this key to the WAN fabric controller in OMP route packets (e.g., in a manner similar to IP route updates). These packets can include information that the WAN fabric controller can use to determine the network topology, including the WAN edge router's TLOC and AES key. The WAN fabric controller can then place these OMP route packets into reachability advertisements that it sends to other WAN edge routers in the overlay network. In this manner, the AES keys for the WAN edge routers can be distributed across the fabric. Even though key exchange is symmetric, the WAN edge routers use it in an asymmetric fashion. This approach can simplify key exchange and improve scalability for authentication by eliminating per-pair keys. This approach can also eliminate the need to deploy a key server.

If control policies configured on the WAN fabric controller limits the communications channels of an individual WAN edge router to a subset of the WAN edge routers of the overlay network, the reachability advertisements sent by the controller can be limited to that subset of routers. Thus, the individual WAN router may only learn the keys for those routers with which it is allowed to communicate. To further strengthen data plane authentication and encryption, the WAN edge routers can regenerate their keys more regularly than conventional devices (e.g., every 24 hours). This can also ensure that no data traffic is dropped when keys change. In the overlay network, the integrity of SAs between WAN edge router peers can be tracked by monitoring BFD packets, which the routers can periodically exchange over the secure connections between the peers. The WAN edge routers can relay the connection status to the WAN fabric controller. If data connectivity between two peers is lost, the exchange of BFD packets stops, and from this, the WAN fabric controller can learn that the connection has been lost.

In some embodiments, the network devices of the WAN fabric (e.g., the WAN orchestrators 104, the WAN management systems 112, the WAN fabric controllers 122, the WAN edge routers 132, etc.) can use IKE or other key exchange protocol when establishing secure tunnels (e.g., IPSec, GRE) between a device within the overlay network and a device that is external to the overlay network, such as a cloud-hosted network appliance, a remote host, and so on. The network devices of the WAN fabric can perform mutual authentication and establish and maintain SAs over the secure tunnels.

Figure 6:
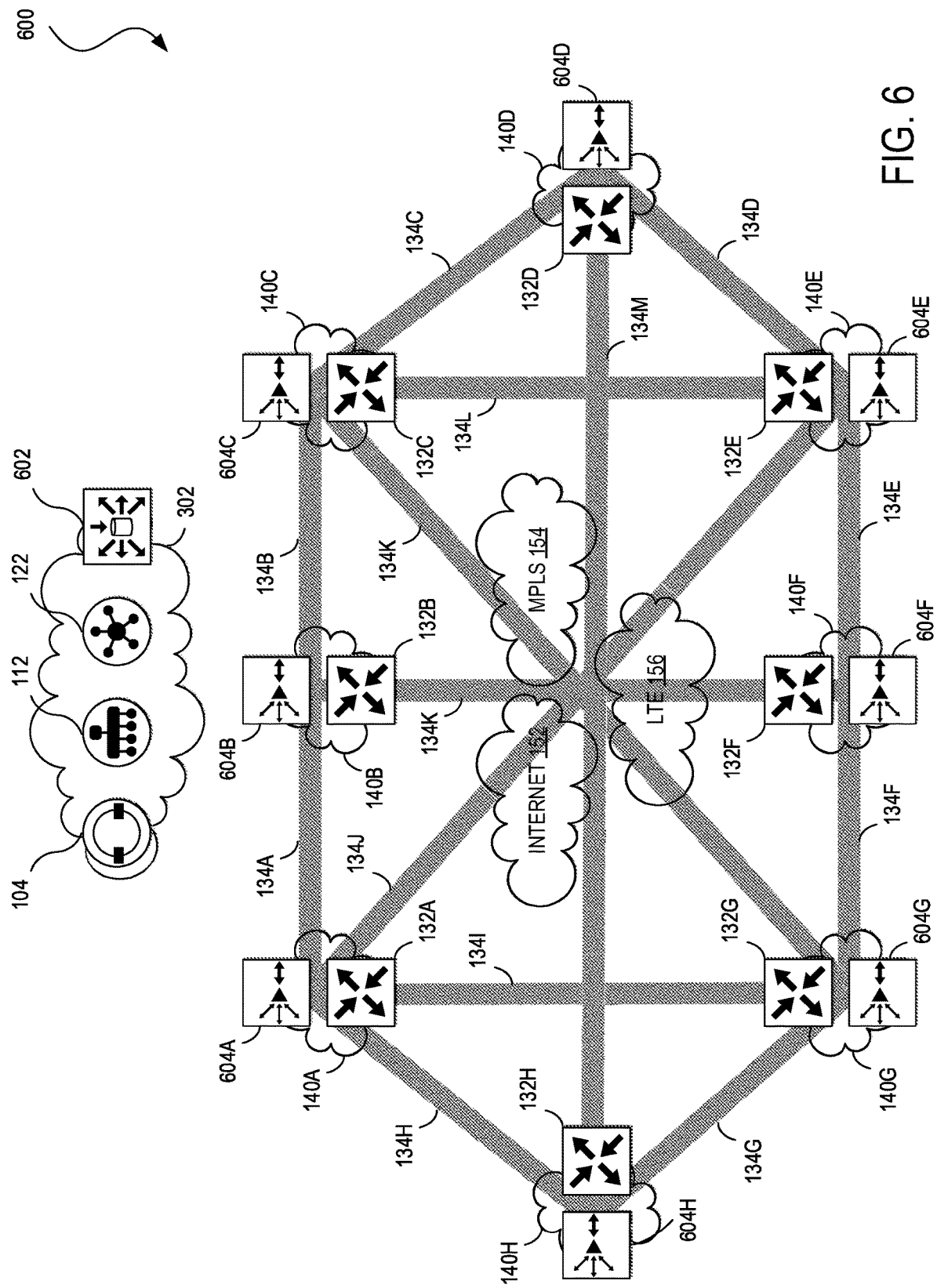
FIG. 6 illustrates an example of a network environment for showing an approach to dynamically discover peer WAN optimizers in a WAN fabric or overlay network in accordance with an embodiment.

FIG. 6 illustrates an example of a network environment 600 showing aspects of integrating WAN optimization in a WAN fabric or overlay network. For instance, the network environment 600 can be the result of the network controllers performing step 502 of the process 500 of authenticating and registering the WAN edge routers 132 and the WAN optimizers 604 to the WAN fabric. The network environment 600 can include the management network 302, the sites 140A-H (collectively, 140), and the WAN transport networks 150, such as the Internet 152, the MPLS network 154, and the LTE network 156, among others. The management network 302 can include the WAN orchestrator 104, the WAN management system 112, the WAN fabric controller 122, and the WAN optimization controller 602. Although the management network 302 is shown as a single network in this example, one of ordinary skill in the art will understand that each component of the management network 302 can be distributed across any number of networks and/or be co-located with one or more of the sites 140.

The WAN optimization controller 602 can be a physical or virtual network appliance for centrally managing the WAN optimizers 604. Although the WAN optimization controller 602 is shown as a distinct network device in this example, the WAN optimization controller can be integrated with one or more WAN orchestrators 104, WAN management systems 112, WAN fabric controllers 122, WAN edge routers 132, or other network devices in other embodiments. The WAN optimization controller 602 can include one or more user interfaces or may be integrated with other user interfaces (e.g., the Cisco® SD-WAN vManage Network Management System (NMS)) to facilitate the configuration, management, and monitoring of the WAN optimizers 604. For high availability, the WAN optimization controller 602 can be deployed in an active/standby configuration such that if the primary WAN optimization controller fails, the WAN optimizers 604 can automatically redirect themselves to a secondary WAN optimization controller. When the primary WAN optimization controller comes back online, the standby can reject requests and the WAN optimizers 604 can query the originally configured primary WAN optimization controller. An example of an implementation of the WAN optimization controller 602 is the Cisco® Wide Area Application Services (WAAS) Central Manager (CM) or the Cisco® virtual WAAS (vWAAS) Central Manager (vCM).

In some embodiments, the WAN optimization controller 602 can include flow distribution features or functions for intercepting certain types of traffic and distributing flows to application-specific WAN optimizers. The flow distribution features or functions can incorporate knowledge of network demand and policy to direct flows to groups of WAN optimizers based on where a flow originated (e.g., a virtual WAN optimizer running in a branch site, a physical WAN optimizer running in a data center or co-location facility, etc.), where the flow is going (e.g., specific applications, such as Hypertext Transfer Protocol (HTTP), Secure Sockets Layer (SSL), other TCP traffic, etc.), the availability and load of the hardware incorporating the WAN optimizer, and so forth. Thus, the flow distribution features or functions can dynamically scale a heterogeneous farm of WAN optimizers that can include physical devices, virtual devices, or both. The flow distribution functions and features can include a clustering mechanism for pooling the computing resources (e.g., processing, memory, storage, etc.) of the WAN optimizers 604 and allocating the resources where they may be needed based on demand and policy. The clustering mechanism can also provide for high availability, as well as address asymmetric routing. For example, the WAN optimizers 604 can be flow-aware such that peer WAN optimizers can have knowledge of flows that are being handled by their peers and can query each other as needed. This can allow for correct handling of data traffic regardless of the path the traffic takes. Additionally, this can preserve the user's intended network paths, and does not require altering paths to handle network directional asymmetry. An example of an implementation of the flow distribution features and functions is Cisco® Application Navigation (AppNav™) technology.

Each site 140 can include one or more WAN optimizers 604 and one or more WAN edge routers 132. The WAN optimizers 604 can be physical and/or virtual network appliances for providing various network services to improve delivery of traffic over a WAN. In some embodiments, physical and/or virtual Cisco® Wide WAAS or vWAAS devices can operate as the WAN optimizers 604. The network services provided by the WAN optimizers 604 can include de-duplication (sometimes referred to as Data Redundancy Elimination (DRE)), compression (e.g., Lempel-Ziv (LZ) compression or Persistent LZ (PLZ) compression), transport layer optimization (sometimes also referred to as Transport Flow Optimization (TFO)), application acceleration (sometimes also referred to as Application Optimization (AO)), and caching, among others.

De-duplication can involve inspection of traffic for redundant patterns (e.g., previously identified patterns) over various block sizes (e.g., 256 Bytes (B), 1 Kilobyte (KB), 4 KB, 16 KB increments, etc.) and creation of a signature or hash for each pattern. The WAN optimizers 604 can maintain a local data store that is linked to a central repository for mapping the signatures or hashes to actual data. If a given pattern is identified within new traffic, a first WAN optimizer 604 can replace that data with its corresponding signature or hash. The first WAN optimizer 604 can transmit the signature or hash across the WAN, and the second WAN optimizer 604 can replace the signature or hash with the actual data from its local store. The WAN optimizers 604 can keep the mappings in their local stores up-to-date with the central repository's mappings and vice versa. This can reduce the size of the traffic as it traverses from one end of the WAN but enable the recovery of the original traffic at the other end of the WAN. De-duplication can be unidirectional or bidirectional. That is, patterns identified in one direction of traffic flow may or may not be de-duped for traffic flowing in the opposite direction depending on the configuration of the WAN optimizers 604 and their available computing resources. De-duplication can also be application-agnostic. That is, patterns identified in a flow for one application can be utilized to de-dupe flows for a different application.

Compression, like de-duplication, can also involve Deep Packet Inspection (DPI) of traffic and substitution of portions of the traffic with shortened representations to reduce the amount of bandwidth consumed by a flow (e.g., from 2:1 to 4:1 compression depending on the application and the data transmitted). Compression can be complementary to de-duplication (e.g., to compress signatures or hashes) and/or independent of de-duplication (e.g., to compress traffic including unidentified data). In general, compression may operate on smaller data streams (e.g., bytes to tens of bytes or less) and maintain limited compression history (e.g., connection-oriented compression history), while de-duplication can operate on larger data streams (e.g., tens to hundreds of bytes or more) and maintain a larger compression history (e.g., WAN optimizer-to-optimizer or peer-to-peer compression history).

Transport layer optimization can include features such as Transport Control Protocol (TCP) window scaling, initial window maximization, increased buffering, Selective Acknowledgment (SACK), and Binary Increase Congestion (BIC), among others. TCP window scaling can address certain limitations imposed by TCP relating to network utilization. By default, TCP restricts the amount of data that can be in transit at any time without acknowledgment up to a specified window size (e.g., 64 KB) (sometimes referred to as the transmit window, send window, effective window, etc.). This can reduce network utilization to a fraction of its capacity or available bandwidth. For relatively high-bandwidth and high-latency links, it is often common to transmit an amount of data up to the transmission window size and to wait for an acknowledgment (ACK) before sending the next window of packets. TCP window scaling, instead, allows hosts to specify a larger transmit window size (e.g., up to 1 GB in some implementations).

TCP initial window maximization can increase the upper limit of the initial window size (e.g., from one to two segments to two to four segments or an even greater number of segments). Increasing the initial window size can provide various advantages. For example, when the initial TCP window is only one segment, a TCP receiver that uses delayed acknowledgments (ACKs) may have to wait for a Retransmission Timeout (RTO) before generating an ACK response. With an initial window of at least two segments, the receiver can instead generate an ACK response after the second TCP segment arrives, eliminating the wait on the timeout. For connections that transmit only a small amount of data, a larger initial window can reduce the transmission time. For instance, the larger initial window size can reduce the data transfer time to a single round-trip time (RTT) for many transfers that are less than 4 KB (e.g., Simple Mail Transfer Protocol (SMTP) and HTTP traffic). For larger transfers, the larger initial window size can eliminate up to three RTTs and a delayed ACK timeout during an initial slow-start phase of TCP.

Increased buffering can enable a pair of WAN optimizers 604 to pull data more aggressively from remote sites 140 to keep the link between them full, thereby increasing link utilization. SACK is a packet loss recovery and retransmission feature that allows hosts to quickly recover from packet losses. By default, TCP uses a cumulative acknowledgment scheme that can require a TCP sender to wait for a round trip to learn if any packets were not received by a receiver or to retransmit segments that may have been correctly received. SACK allows the receiver to inform the sender about segments that have arrived successfully. The TCP sender may then retransmit only the segments that have actually been lost.

BIC is a congestion management protocols that can allow for quick recovery from packet loss. When packet loss occurs, BIC can reduce the transmission window size and set that reduced size as the new value for the minimum window. BIC can set the maximum window size to the size of the transmission window just before packet loss occurred. As packet loss occurred at the maximum window size, BIC can continue transmission without dropping packets whose size falls within the minimum and maximum window size values. If BIC does not register a packet loss at the updated maximum window size, that window size can become the new minimum. If packet loss occurs, that window size can become the new maximum. This process can continue until BIC determines the new optimal minimum and maximum window sizes.

Application acceleration can provide optimizations for specific applications or application protocols, such as file sharing applications or protocols (e.g., Common Internet File System (CIFS), Server Message Block (SMB), Network File Server (NFS), etc.), email applications or protocols (e.g., Messaging Application Programming Interface (MAPI), Encrypted MAPI (EMAPI), etc.), web applications or protocols (e.g., HTTP, Secure HTTP (HTTPS), SSL, etc.), and Content Delivery Network (CDN) software, among others. CIFS acceleration can include safe data and metadata caching, read-ahead processing, message pipelining, prepositioning, printing acceleration, intelligent file server offloading, invalid file identifier processing, and batch close optimization, among others. Safe data and metadata caching can maintain copies of objects and metadata locally (e.g., at the WAN optimizers 604) to reduce the transmission of file server data over the WAN. The data can be validated against file servers for coherency to ensure that clients do not receive stale data. Read-ahead processing can reduce latency on CIFS by requesting data on behalf of clients prior to explicit requests by the clients. This data can then be used, when safe, to respond to the clients on behalf of file servers. Messaging pipelining enables streaming of CIFS messages over the WAN to mitigate the effects of the send-and-wait behavior of file server protocols. Message pipelining can also allow operations to occur in parallel rather than in serial, thus improving performance for clients. Prepositioning can schedule copying of file server data and metadata to improve performance for initial access to files. Prepositioning can be especially helpful for transferring large objects across the WAN (e.g., software distribution, desktop management applications, etc.). Printing acceleration can intelligently accelerate file printing traffic over the WAN to allow centralization of printing services. Printing acceleration can also reduce the amount of hardware needed within the sites 140 without compromising printing performance. Intelligent file server offloading can reduce the burden placed on origin servers by serving data locally to the requesting client when the client is authenticated and authorized and the cached contents are validated as coherent with the origin file servers. As a result, the origin file servers see fewer direct requests and directly transfer less data. Invalid file processing can deny requests to access files with invalid file handle values locally instead of having to send the requests to the server. Batch close optimization enables asynchronous closing of a large number of files at a later time for file-sharing traffic.

SMB acceleration can include local metadata handling and caching, partial file caching, write-back caching, advance file read, negative caching, and signaling message prediction and reduction, among others. Local metadata handling and caching can allow metadata (e.g., file attributes, directory information, etc.) to be cached and served locally to optimize client access. Partial file caching can propagate only the segments of a file that have been updated on write requests rather than the entire file. Write-back caching can facilitate efficient write operations by allowing buffering of write requests and asynchronous streaming of updates to a central file server without risking data integrity. Advance file read can allow file to be read in advance of client requests when an application is conducting a sequential file read. Negative caching can store information about missing files to reduce the number of round trips across the WAN. Signaling message prediction and reduction can use local request and response caching to reduce the number of round trips over the WAN without loss of semantics.

NFS acceleration can include metadata optimization, read-ahead optimization, and file write optimization, among others. Metadata optimization can pipeline interactive operations (e.g., directory traversal) to reduce the amount of time required to traverse directories and view file and directory metadata. Additionally, metadata optimization can cache metadata, when it is safe to do so, to reduce the number of performance-limiting operations that traverse the WAN. Read-ahead optimization can enable prefetching of data from a file being accessed to make it readily available for faster read throughput. File write optimization can enable asynchronous write operations to batch write messages and eliminate the send-and-wait behavior of NFS file write operations while working in conjunction with existing NFS protocol semantics to help ensure file data integrity.

Email acceleration can include asynchronous write operations, object read-ahead, message decompression, de-duplication hints, and payload aggregation, among others. Asynchronous write operations can acknowledge the transmission of email and attachments locally. Local generation of responses can allow clients to fully utilize WAN bandwidth. Object read-ahead can enable certain objects (e.g., email, calendar items, address books, etc.) to be fetched at an accelerated rate or pre-fetched on behalf of clients. Message decompression can automatically defer native compression provided by an email server in favor of DRE and LZ compression. Message decompression can also natively decode messages encoded by email servers to provide additional levels of compression. De-duplication hints can provide hints to the de-duplication process based on the message payload for better compression and overall improvement in de-duplication efficiency. Payload aggregation can batch small messages together for optimized delivery or dynamically adjust de-duplication and LZ compression to improve compression ratios for them.

Web acceleration features can include fast connection reuse, connection multiplexing, and local response, among others. Fast connection reuse can decrease the load time for complex webpages (e.g., webpages with numerous embedded objects) when the client or server cannot use persistent connections. These connections can remain active for a short time period so that they can be reused if additional data between the client and server need to be exchanged. Connection multiplexing can allow for the reuse of persistent connections between clients and servers rather than establishing multiple connections. Fast connection reuse and connection multiplexing can eliminate the latency associated with establishing multiple connections between clients and servers. Local response enables the use of cached metadata from previously seen server responses to respond to certain HTTP requests rather than directly forwarding the requests to the servers and waiting for the server responses.

The local responses can be continuously updated to ensure clients do not receive stale data.

SSL acceleration can enable the WAN optimizers 604 to become trusted intermediary devices to decrypt incoming encrypted data, apply the appropriate set of optimizations, and re-encrypt data for further delivery over the WAN. Certificate private keys can be installed into a secure store, and the certificates can be used by other WAN optimizers in the network. Disk encryption can be applied to the WAN optimizers 604 to ensure protection of stored data found in optimized connections should the optimizers or their disks be physically compromised. SSL acceleration can also enable the WAN optimizers 604 to operate as SSL proxies for origin servers in order to control SSL sessions. Session keys can be securely distributed to a pair of WAN optimizers 604 participating in an SSL session, which can allow the optimizers to decrypt, optimize, and re-encrypt traffic. SSL acceleration can also include support for a number of critical security-related features (e.g., Online Certificate Status Protocol (OCSP), certificate revocation checks/validation, etc.).

CDN acceleration can include transparent caching, dynamic Uniform Resource Locator (URL) caching or over-the-top caching, and content prepositioning, among others. Transparent caching can locally cache HTTP-based content, regardless of whether the web application was served from a private cloud or the public Internet. Transparent caching can comprise three modes, basic, standard, and advanced, each of which can be configured at the global, domain, or host level. The basic mode may cache objects having explicit caching directives. The standard mode can cache objects having server caching directives, as well as make intelligent caching decisions for objects that do not have caching directives. The advanced mode can cache objects having client or server caching directives and make intelligent caching decisions about the objects to be cached but may cache more aggressively relative to the standard mode. Dynamic URL HTTP caching or over-the-top caching can cache HTTP content served from dynamically generated URLs and content that may not normally be cacheable, such as videos used for product demonstrations and advertisements displayed in stores on digital signage, employee training, and other contexts. Content prepositioning can allow for defining of policies to proactively fetch content on a specific schedule. This can populate the HTTP web cache during non-peak times, and improve application performance and increase network offload when the network is busiest.

Object caching and metadata caching can be application-specific (unlike de-duplication and compression). The cache can be built with pieces of an object or the entire object, along with its associated metadata. With caching, if a client attempts to access an object, a directory listing, or file attributes that are stored in the cache, such as a file previously accessed from a particular file server, the file can be safely served from the WAN optimizers 604.

The WAN optimizers 604 can be configured in-line or off-path relative to hosts 306 (not shown in FIG. 6) and the WAN edge routers 132. The WAN optimizers 604 are in-line when traffic between the hosts 306 and the WAN edge routers 132 flow directly through the WAN optimizers. An inline configuration can reduce configuration changes to adjacent network devices as the WAN optimizers 604 may be transparent at the IP layer, appearing as transparent bridges. The WAN optimizers 604 are off-path when traffic between the hosts 306 and the WAN edge routers 132 is routed to and from the routers to the WAN optimizers for optimization. This can be useful to eliminate network throughput bottlenecks that can result from the change in speed between interfaces between LANs and WANs, and can be less disruptive to deploy and add capacity on demand.

In the example of FIG. 6, the WAN fabric controller 122 and the WAN edge routers 132 have mutually authenticated one another, and the controller has successfully registered the routers to the overlay network. The devices can persist the secure control plane connections 124 (not shown in FIG. 6) used for authentication and registration to exchange control plane information. The WAN edge routers 132 have also formed secure connections 134A-134L (collectively, 134) with one another across the WAN transport networks 150. The WAN edge routers 132 and the WAN optimizers 604 may exchange information regarding the health and performance of the WAN optimizers (e.g., connection capacity, flow latency, number of flows, etc.) and/or the health and performance of the connections (e.g., loss, latency, jitter, etc.) between the WAN edge routers and the WAN optimizers (e.g., via BFD). In some embodiments, the WAN edge routers 132 may provide the health performance information of the WAN optimizers 604 and/or the connections with the WAN optimizers to the WAN fabric controller 122 and/or the WAN optimization controller 602 over the secure control channel 124.

Returning to FIG. 5, the process 500 can continue to step 504 in which the network can receive a request for a WAN optimized connection between a first host within a first LAN of the plurality of LANs and a second host within a second LAN of the plurality of LANs. For example, the network controllers can receive one or more network policies to perform WAN optimization services on certain types of traffic. The network controllers can configure the WAN edge routers with these policies. A first local WAN edge router (local to the first host) can apply the policies when the first host requests to connect to the second host to determine that the traffic between the first host and the second host should be routed through a WAN optimized connection. Thus, unlike conventional networks that depend on the WAN optimizers to perform TCP auto discovery to establish a WAN optimized connection, the network controllers can facilitate discovery between the WAN optimizers. This can be advantageous as the network controllers have visibility over the health and performance of the secure tunnels throughout the WAN fabric and the health and performance of the WAN optimizers and/or the connections between the WAN optimizers and the WAN edge routers. Thus, the network controllers may be capable of determining both the optimal route through the WAN fabric and through specific WAN optimizers of the overlay network.

At step 506, the network controllers can identify a first WAN optimizer among the plurality of WAN optimizers having the capacity to perform one or more first WAN optimization services (e.g., de-duplication, compression, transport flow optimization, application acceleration, caching, etc.) for first traffic transmitted from the first host to the second host and to perform one or more first complementary WAN optimization services for second traffic (e.g., return traffic) from the second host to the first host. The network controllers can also identify a second WAN optimizer among the plurality of registered WAN optimizers having the capacity to perform one or more second WAN optimization services for the second traffic and to perform one or more second complementary WAN optimization services for the first traffic.

In some embodiments, the second WAN optimizer may be local to the second host. In other embodiments, the network controllers may determine there is no WAN optimizer local to the second host and/or there is no WAN optimizer local to the second host with current capacity to perform the one or more second WAN optimization services and the one or more second complementary WAN optimization services. In this situation, the network controllers can select a WAN optimizer in a third LAN of the plurality of LANs (remote to the second host) as the second WAN optimizer, and the second WAN edge router may reside in the third LAN. In some cases, the selection may be based on evaluation of several different paths across the overlay network, such as one or more first measurements (e.g., loss, latency, jitter, etc.) of a first tunnel between a local WAN edge router local to the second host and the first WAN edge router, one or more second measurements of a second tunnel between the local WAN edge router and the second WAN edge router, and one or more third measurements of a third tunnel between the second WAN edge router and the first WAN edge router. The network controllers can route the second traffic from the local WAN edge router to the second WAN optimizer via the second tunnel and the first traffic from the first WAN edge router to the second WAN optimizer via the third tunnel.

Figure 7:
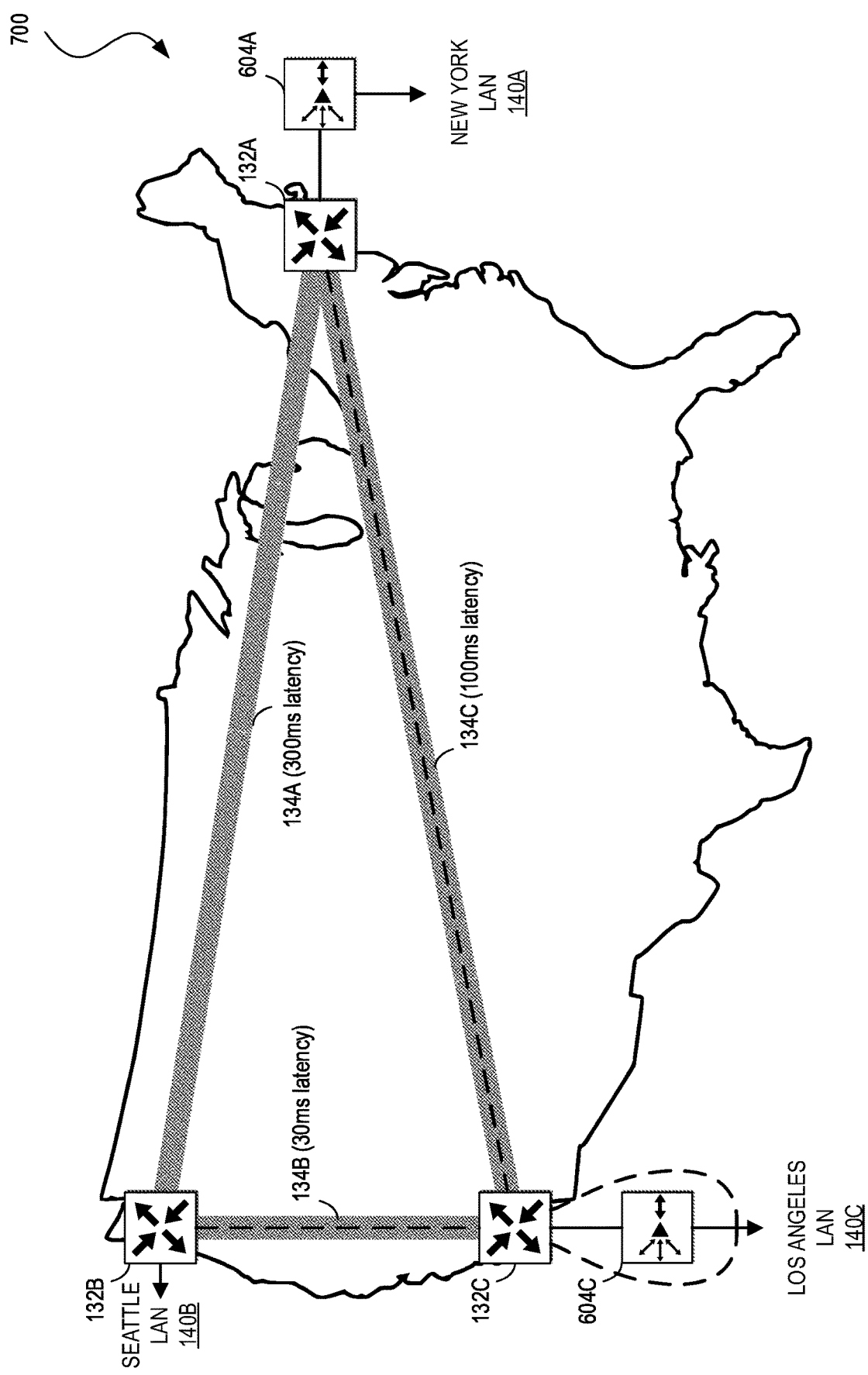
FIG. 7 illustrates an example of a network environment for showing an approach to dynamically select peer WAN optimizers in a WAN fabric or overlay network in accordance with an embodiment.

FIG. 7 illustrates an example of a network environment 700 for showing an approach to dynamically select peer WAN optimizers in a WAN fabric or overlay network. The network environment 700 includes sites 140A-140C (collectively, 140) in remote geographic locations, New York, Seattle, and San Francisco, respectively. Each of the sites 140 can include one or more WAN edge routers 132 that are each connected to one another over secure tunnels 134. In this example, there may be one or more policies deployed in the network environment 700 that traffic between hosts in the sites 140A and 140B should be routed over a WAN optimized connection or between peer WAN optimizers across the WAN fabric when WAN optimization is available. Based on these policies, when the network receives a request for a connection between a first host in a first LAN (e.g., the site 140A) and a second host in a second LAN (e.g., the site 140B), the network may check for the availability of a set of peer WAN optimizers to determine whether to optimize the traffic. In some embodiments, the WAN optimizer 604A may directly query the network controllers if they have established connections between them. In other embodiments, the WAN optimizer 604A may query the WAN edge router 132A, which can obtain this information via OMP over the secure channel 124 (not shown in FIG. 7) between the network controllers and the router. In either case, the network controllers can monitor the statuses of the WAN optimizers 604 and/or the connections between the WAN edge routers 132 and the WAN optimizers, identify the set of peer WAN optimizers having the capacity to perform the WAN optimization services, and distribute service routes to the peer WAN optimizers to the WAN edge routers 132.

In this example, the network controllers may determine that the WAN optimizer 604A in the site 140A (e.g., the first LAN) and the WAN optimizer 604C in the site 140C (e.g., the third LAN) have capacity to perform WAN optimization services for traffic between the first and second hosts. The network controllers may determine that the site 140B (e.g., the second LAN) does not include a WAN optimizer that has capacity to perform the WAN optimization services. For instance, the site 140B may not include a WAN optimizer altogether. As another example, the network controllers can monitor the connection capacity, flow latency, number of flows, and so forth, of a physical WAN optimizer in the site 140B, and the controllers may determine that the physical WAN optimizer is currently overloaded. As yet another example, the network controllers can monitor computing resources (e.g., processing, memory, storage, etc.) available at the site 140B for provisioning virtual network appliances, and the controllers may determine that there are insufficient resources to instantiate a virtual WAN optimizer.

In some embodiments, the network controllers can additionally or alternatively evaluate the health and performance of the data tunnels 134 (e.g., loss, latency, jitter, etc.) throughout the overlay network to identify a set of peer WAN optimizers through which to route traffic between hosts in the sites 140A and 140B. For example, the network controllers may detect a latency of 300 milliseconds (ms) across the secure tunnel 134A (e.g., the first tunnel) between the WAN edge router 132A (e.g., the first WAN edge router) and the WAN edge router 132B (e.g., the WAN edge router local to the second host), a latency of 30 ms across the secure tunnel 134B (e.g., the second tunnel) between the WAN edge router 132B and 132C (e.g., the second WAN edge router), and a latency of 100 ms between the secure tunnel 134C (e.g., the third tunnel) between the WAN edge routers 132A and 132C. Based on these latency measurements, the network controllers may determine that the optimal path between peer WAN optimizers is through the secure tunnels 134C and 134B, and the controllers can identify the WAN optimizers 604A and 604C as the set of WAN optimizers through which to route traffic between hosts in the sites 140A and 140B.

In some embodiments, the first WAN optimizer may be local to the first host as in the example of FIG. 7. In other embodiments, the network controllers may determine there is no WAN optimizer local to the first host and/or there is no WAN optimizer local to the first host with current capacity to perform the one or more first WAN optimization services and the one or more first complementary WAN optimization services. In this situation, the network controllers can select a WAN optimizer in a third LAN (e.g., Miami) (not shown in FIG. 7) as the first WAN optimizer, and the first WAN edge router may reside in the third LAN. In some cases, the selection may be based on evaluation of several different paths across the overlay network, such as one or more first measurements (e.g., loss, latency, jitter, etc.) of a first tunnel between a local WAN edge router local to the first host (e.g., the WAN edge router 132A) and the second WAN edge router (e.g., the WAN edge router 132B), one or more second measurements of a second tunnel between the local WAN edge router and the first WAN edge router (e.g., a WAN edge router in Miami), and one or more third measurements of a third tunnel between the first WAN edge router and the second WAN edge router. The network controllers can route the first traffic from the local WAN edge router to the first WAN optimizer via the second tunnel and the second traffic from the second WAN edge router to the first WAN optimizer via the third tunnel.

In some embodiments, the network controllers may determine there is no WAN optimizer local to the first host and/or there is no WAN optimizer local to the first host with current capacity to perform the one or more first WAN optimization services and the one or more first complementary WAN optimization services as well as no WAN optimizer local to the second host and/or there is no WAN optimizer local to the second host with current capacity to perform the one or more second WAN optimization services and the one or more second complementary WAN optimization services. In this situation, the network controllers can select a WAN optimizer in a third LAN (e.g., Miami) (not shown in FIG. 7) as the first WAN optimizer, and the first WAN edge router may reside in the third LAN. In addition, the network controllers can select a WAN optimizer in a fourth LAN (e.g., Los Angeles) as the second WAN optimizer, and the second WAN edge router may reside in the fourth LAN. In some cases, the selection may be based on evaluation of several different paths across the overlay network, such as one or more first measurements (e.g., loss, latency, jitter, etc.) of a first tunnel between a first local WAN edge router local to the first host (e.g., the WAN edge router 132A) and a second local WAN edge router local to the second host (e.g., the WAN edge router 134B), one or more second measurements of a second tunnel between the first local WAN edge router and the first WAN edge router (e.g., a WAN edge router in Miami), one or more third measurements of a third tunnel between the second local WAN edge router and the second WAN edge router, and one or more fourth measurements of a fourth tunnel between the first WAN edge router and the second WAN edge router. The network controllers can route the first traffic from the first local WAN edge router to the first WAN optimizer via the second tunnel and the second traffic from the second local WAN edge router to the second WAN optimizer via the third tunnel.

In still other embodiments, when the network controllers determine there is no WAN optimizer local to the second host that has capacity to perform the one or more second WAN optimization services and the one or more second complementary WAN optimization services, the controllers can instantiate a virtual WAN optimizer in the second LAN to operate as the second WAN optimizer. Similarly, when the network controllers determine there is no WAN optimizer local to the first host that has capacity to perform the one or more first WAN optimization services and the one or more first complementary WAN optimization services, the controllers can instantiate a virtual WAN optimizer in the first LAN to operate as the first WAN optimizer.

Returning to FIG. 5, the process 500 may proceed to step 508 in which the network controllers can establish the WAN optimized connection between the first host and the second host. For example, the first WAN edge router (e.g., a WAN edge router local to the first host when there the first WAN optimizer is local to the first host or a WAN edge router in a third LAN local to the first WAN optimizer when there is no WAN optimizer local to the first host having capacity to perform the first WAN optimization services and the first complementary WAN optimization services) can operate as a TCP proxy to the first host, and the second WAN edge router (e.g., a WAN edge router local to the second host when the second WAN optimizer is local to the second host or a WAN edge router in a fourth LAN local to the second WAN optimizer when there is no WAN optimizer local to the second host having capacity to perform the second WAN optimization services and the second complementary WAN optimization services) can operate as a TCP proxy to the second host. The first WAN edge router can terminate a first TCP connection from the first host and establish a second TCP connection with the second WAN edge router, and the second WAN edge router can establish a third TCP connection to the second host. That is, the network can stitch together the WAN optimized connection that comprises the first TCP connection (including the first host, the first WAN optimizer, and the first WAN edge router), the second TCP connection (including the first WAN edge router and the second WAN edge router), and the third TCP connection (including the second WAN edge router, the second WAN optimizer, and the second host).

In some embodiments, the network controllers can establish symmetry for the WAN optimized connection by influencing how traffic flows from the LAN to the WAN and vice versa. For example, in the LAN-to-WAN direction, the network controllers can influence traffic by setting VRRP priority, creating a route policy that modifies the metric of routes distributed from OMP to OSPF, creating a route policy that modifies the Multi Exit Discriminator (MED) metric of routes distributed from OMP to BGP. From the WAN-to-LAN direction, the network controllers can influence traffic by setting a preference for a particular data plane tunnel (e.g., the secure tunnel 134).

As discussed above, some WAN optimizers shift sequence numbers by a specified range (e.g., by 2 Gigabytes (GB)) to help differentiate unoptimized traffic from optimized traffic and to gracefully handle when one or both of a pair of peer WAN optimizers become inaccessible. Some network security appliances (e.g., firewalls, IDPs, VPN gateways, etc.) may consider this suspicious behavior, drop the traffic, and reset the WAN optimized connection. Some conventional networks may attempt to overcome these issues by manually configuring static routes between hosts. However, this approach is not scalable in modern enterprise networks. Another conventional approach is to establish tunnels through the network security to allow optimization traffic through the tunnels. However, this approach and renders existing security policies ineffective because optimized traffic is obfuscated. Further, stateful inspection performed on this traffic is performed against the tunnel packets and not against the original flow. To overcome these issues, at step 510, the network controllers can provision one or more network controllers that allow traffic whose sequence numbers are outside of the specified range of previous traffic, and update the WAN optimized connection to include the one or more network security appliances in between the first WAN optimizer and the second WAN optimizer.

Figure 8:
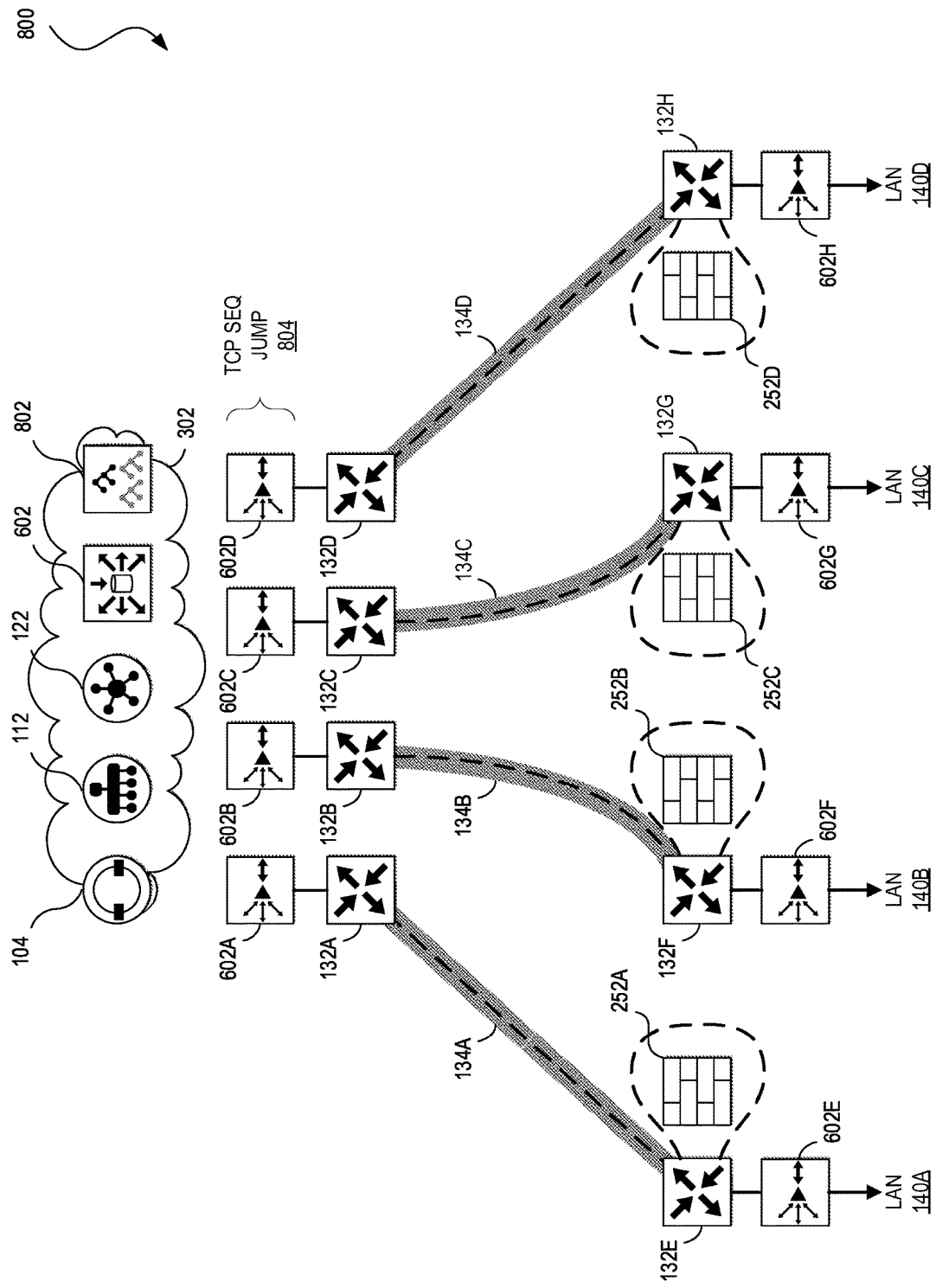
FIG. 8 illustrates an example of a network environment for showing an approach to dynamically provision network appliances in a WAN fabric or overlay network in accordance with an embodiment.

FIG. 8 illustrates an example of a network environment 800 for showing an approach to dynamically provision network appliances in a WAN fabric or overlay network. The network environment 800 includes a management network 302 and sites 140A-140D (collectively, 140). The management network 302 can include the WAN orchestrator 104, the WAN management system 112, the WAN fabric controller 122, the WAN optimization controller 602, and an NFV orchestrator 802. Although the management network 302 is shown as a single network in this example, one of ordinary skill in the art will understand that each component of the management network 302 can be distributed across any number of networks and/or be co-located with one or more of the sites 140.

The NFV orchestrator 802 can be a physical or virtual network appliance for managing and orchestrating virtual network appliances (e.g., firewalls, IDPs, NATs, WAN optimizers, etc.) on standard x86-based hardware. An example of an implementation of the NFV orchestrator 802 is the Cisco® Network Services Orchestrator (NSO). The NFV orchestrator 802 can include an orchestrator to automate the deployment of virtualized network appliances comprising Virtualized Network Functions (VNFs), the VNFs for providing specific network services, NFV infrastructure software to manage and operate the VNFs (e.g., to provide VNF lifecycle management, monitoring, device programmability, hardware acceleration, etc.), and the x86-based computing resources (e.g., processing, memory, storage, etc.) on which the orchestrator VNFs run. Some of the VNFs the NFV orchestrator 802 can provision include virtual routers (e.g., Cisco® virtual Integrated Services Routers (ISRv's)), virtual firewalls (e.g., Cisco® virtual Adaptive Security Appliances (ASAv's), virtual IDPs (e.g., Cisco Firepower™ virtual Next-Generation Firewalls (NGFWv)), virtual WAN optimizers (e.g., Cisco® vWAAS), and virtual Wireless LAN Controllers (WLCs) (e.g., Cisco virtual WLCs (vWLCs)), among others. The NFV orchestrator 802 can also provision virtual machines, containers, and other virtual instances for running DNS servers, DHCP servers, web servers, Authentication, Authorization, and Accounting (AAA) servers, software distribution servers, and so on.

The sites 140A-D can include WAN edge routers 132E-H, respectively, that may be connected to WAN edge routers 132A-D over secure tunnels 134A-D. The sites 140A-D can also include the WAN optimizers 602E-H, respectively, that peer with the WAN optimizers 602A-D, respectively. In this example, when the WAN optimizers 602A-D optimize traffic received from the LAN segment of their sites (not shown in FIG. 8), the WAN optimizers may shift the sequence numbers of the traffic by a specified amount (e.g., 2 GB) to differentiate unoptimized traffic from optimized traffic and to gracefully handle when one or both of a pair of peer WAN optimizers become inaccessible. The network environment 800 may deploy one or more policies that the optimized traffic should be routed through one or more network security appliances 252 (e.g., firewalls, IDPs, etc.). Thus, the network can provision the firewalls 252A-D in the sites 140A-D, respectively, and route the optimized traffic through the firewalls. In some embodiments, the network may additionally or alternatively provision one or more network security appliances within the sites where the WAN edge routers 132A-D and the WAN optimizers 602A-D are located, and route the optimized traffic through the provisioned network security appliances. In this manner, the network may continue enforcing security policies for optimized traffic without the risk of firewalls, IDPs, and other network security appliances dropping the optimized traffic and/or resetting the WAN optimized connections when the WAN optimizers shift the sequence numbers of the optimized traffic by a specified amount from previously seen traffic.

Returning to FIG. 5, the process 500 can conclude at step 512 in which the network controllers can route the first traffic and the second traffic through the WAN optimized connection.

In some embodiments, at least one of the first WAN optimizer can be deployed in-line between the first host and the first WAN edge router or the second WAN optimizer can be deployed in-line between the second WAN edge router and the second host. That is, the first WAN optimizer can be physically deployed in between the first host and the first WAN edge router and/or the second WAN optimizer can be physically deployed in between the second host and the second host and the second WAN edge router. The first WAN optimizer can bridge traffic between the first host and the first WAN edge router and/or the second WAN optimizer can bridge traffic between the second host and the second WAN edge router. In some embodiments, at least one of the first WAN optimizer is off-path relative to a data path between the first host and the first WAN edge router or the second WAN optimizer is off-path relative to a data path between the second WAN edge router and the second host. That is, the first WAN optimizer can be deployed off of a data path between the first host and the first WAN edge router, and/or the second WAN optimizer can be deployed off of a data path between the second host and the second WAN optimizer. The first WAN optimizer can be configured to intercept certain traffic to perform the first WAN optimization services and the first complementary WAN optimization services, and/or the second WAN optimizer can be configured to intercept certain traffic to perform the second WAN optimization services and the second complementary WAN optimization services. Numerous other functions and advantages are described and suggested below as may be provided in accordance with the various embodiments.

FIG. 9 illustrates an example of a network device 900 (e.g., switch, router, network appliance, etc.). The network device 900 can include a master central processing unit (CPU) 902, interfaces 904, and a bus 906 (e.g., a Peripheral Component Interconnect (PCI) bus). When acting under the control of appropriate software or firmware, the CPU 902 can be responsible for executing packet management, error detection, and/or routing functions. The CPU 902 preferably accomplishes all these functions under the control of software including an operating system and any appropriate applications software. The CPU 902 may include one or more processors 908 such as a processor from the Motorola family of microprocessors or the Microprocessor without Interlocked Pipelined Stages (MIPS) family of microprocessors. In an alternative embodiment, the processor 908 can be specially designed hardware for controlling the operations of the network device 900. In an embodiment, a memory 910 (such as non-volatile Random Access Memory (RAM) and/or Read-Only Memory (ROM)) can also form part of the CPU 902. However, there are many different ways in which memory could be coupled to the system.

The interfaces 904 can be provided as interface cards (sometimes referred to as line cards). The interfaces 904 can control the sending and receiving of data packets over the network and sometimes support other peripherals used with the network device 900. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 904 may include ports appropriate for communication with the appropriate media. In some cases, the interfaces 904 may also include an independent processor and, in some instances, volatile RAM. The independent processors may control communication intensive tasks such as packet switching, media control, and management. By providing separate processors for the communication intensive tasks, the interfaces 904 may allow the CPU 902 to efficiently perform routing computations, network diagnostics, security functions, and so forth.

Although the system shown in FIG. 9 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 900.

Regardless of the network device's configuration, it may employ one or more memories or memory modules (including the memory 910) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 10A:
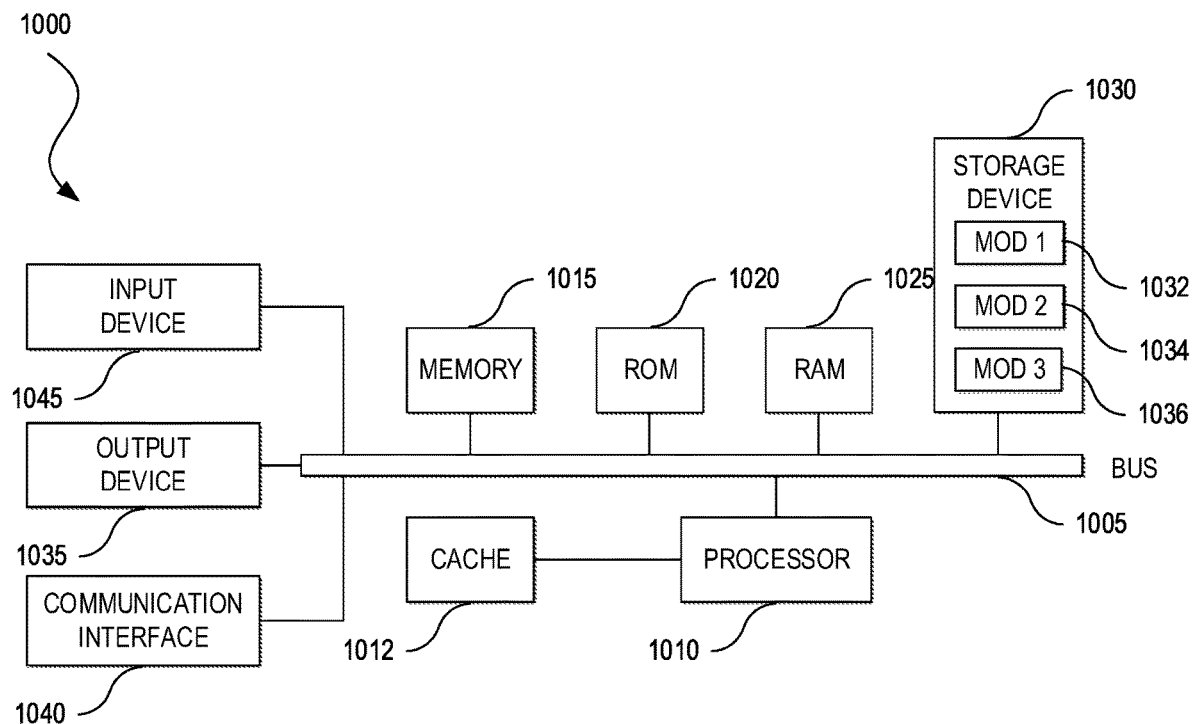
FIGS. 10A and 10B illustrate examples of computing systems in accordance with some embodiments.
Figure 10B:
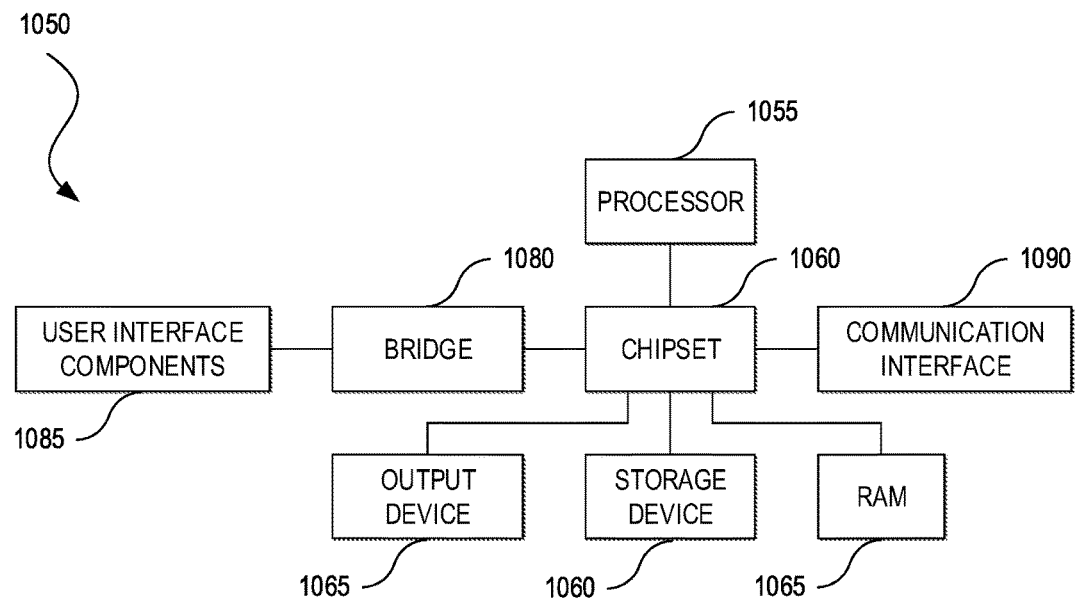

FIGS. 10A and 10B illustrate systems in accordance with various embodiments. The more appropriate system will be apparent to those of ordinary skill in the art when practicing the various embodiments. Persons of ordinary skill in the art will also readily appreciate that other systems are possible.

FIG. 10A illustrates an example of a bus computing system 1000 wherein the components of the system are in electrical communication with each other using a bus 1005. The computing system 1000 can include a processing unit (CPU or processor) 1010 and a system bus 1005 that may couple various system components including the system memory 1015, such as read only memory (ROM) 1020 and random access memory (RAM) 1025, to the processor 1010. The computing system 1000 can include a cache 1012 of high-speed memory connected directly with, in close proximity to, or integrated as part of the processor 1010. The computing system 1000 can copy data from the memory 1015, ROM 1020, RAM 1025, and/or storage device 1030 to the cache 1012 for quick access by the processor 1010. In this way, the cache 1012 can provide a performance boost that avoids processor delays while waiting for data. These and other modules can control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in the storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing system 1000, an input device 1045 can represent any number of input mechanisms, such as a microphone for speech, a touch-protected screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing system 1000. The communications interface 1040 can govern and manage the user input and system output. There may be no restriction on operating on any particular hardware arrangement and therefore the basic features here may be substituted for improved hardware or firmware arrangements as they are developed.

The storage device 1030 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 1030 can include the software modules 1032, 1034, 1036 for controlling the processor 1010. Other hardware or software modules are contemplated. The storage device 1030 can be connected to the system bus 1005. In some embodiments, a hardware module that performs a particular function can include a software component stored in a computer-readable medium in connection with the necessary hardware components, such as the processor 1010, bus 1005, output device 1035, and so forth, to carry out the function.

FIG. 10B illustrates an example architecture for a chipset computing system 1050 that can be used in accordance with an embodiment. The computing system 1050 can include a processor 1055, representative of any number of physically and/or logically distinct resources capable of executing software, firmware, and hardware configured to perform identified computations. The processor 1055 can communicate with a chipset 1060 that can control input to and output from the processor 1055. In this example, the chipset 1060 can output information to an output device 1065, such as a display, and can read and write information to storage device 1070, which can include magnetic media, solid state media, and other suitable storage media. The chipset 1060 can also read data from and write data to RAM 1075. A bridge 1080 for interfacing with a variety of user interface components 1085 can be provided for interfacing with the chipset 1060. The user interface components 1085 can include a keyboard, a microphone, touch detection and processing circuitry, a pointing device, such as a mouse, and so on. Inputs to the computing system 1050 can come from any of a variety of sources, machine generated and/or human generated.

The chipset 1060 can also interface with one or more communication interfaces 1090 that can have different physical interfaces. The communication interfaces 1090 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 1055 analyzing data stored in the storage device 1070 or the RAM 1075. Further, the computing system 1050 can receive inputs from a user via the user interface components 1085 and execute appropriate functions, such as browsing functions by interpreting these inputs using the processor 1055.

It will be appreciated that computing systems 1000 and 1050 can have more than one processor 1010 and 1055, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial (USB) devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
  receiving a request for a wide area network (WAN) optimized connection between a first host within a first local area network (LAN) of a plurality of LANs and a second host within a second LAN of the plurality of LANs;
  identifying a first WAN optimizer that has capacity to perform one or more WAN optimization services for traffic transmitted between the first host and the second host and a second WAN optimizer that has capacity to perform one or more complementary WAN optimization services of the one or more WAN optimization services to the traffic transmitted between the first host and the second host;
  establishing the WAN optimized connection between the first host and the second host, the WAN optimized connection comprising a first path including the first host, the first WAN optimizer, and a first WAN edge router local to the first WAN optimizer, a second path between the first WAN edge router and a second WAN edge router local to the second WAN optimizer, and a third path between the second WAN edge router and the second WAN optimizer; and
  routing the traffic through the WAN optimized connection.

2. The computer-implemented method of claim 1, further comprising:
  provisioning one or more network security appliances that allow traffic whose sequence numbers are outside of a specified range of previous traffic; and
  updating the WAN optimized connection to include the one or more network security appliances in between the first WAN optimizer and the second WAN optimizer.

3. The computer-implemented method of claim 1, further comprising:
  monitoring a capacity of each of the plurality of WAN optimizers to perform WAN optimization services on traffic transmitted among a plurality of WAN edge routers.

4. The computer-implemented method of claim 1, further comprising:
  determining there is no WAN optimizer local to the second host that has capacity to perform the one or more second WAN optimization services and the one or more second complementary WAN optimization services;
  selecting the second WAN optimizer in a third LAN of the plurality of LANs based on evaluation of one or more first measurements of a first tunnel between a local WAN edge router local to the second host and the first WAN edge router, one or more second measurements of a second tunnel between the local WAN edge router and the second WAN edge router, and one or more third measurements of a third tunnel between the second WAN edge router and the first WAN edge router; and
  routing the second traffic from the local WAN edge router to the second WAN optimizer via the second tunnel and the first traffic from the first WAN edge router to the second WAN optimizer via the third tunnel.

5. The computer-implemented method of claim 1, further comprising:
  determining there is no WAN optimizer local to the first host that has capacity to perform the one or more first WAN optimization services and the one or more first complementary WAN optimization services;
  selecting the first WAN optimizer in a third LAN of the plurality of LANs based on evaluation of one or more first measurements of a first tunnel between a local WAN edge router local to the first host and the second WAN edge router, one or more second measurements of a second tunnel between the local WAN edge router and the first WAN edge router, and one or more third measurements of a third tunnel between the first WAN edge router and the second WAN edge router; and
  routing the first traffic from the local WAN edge router to the first WAN optimizer via the second tunnel and the second traffic from the second WAN edge router to the first WAN optimizer via the third tunnel.

6. The computer-implemented method of claim 1, further comprising:
  determining there is no WAN optimizer local to the first host that has capacity to perform the one or more first WAN optimization services and the one or more first complementary WAN optimization services, and there is no WAN optimizer local to the second host that has capacity to perform the one or more second WAN optimization services and the one or more second complementary WAN optimization services;
  selecting the first WAN optimizer in a third LAN of the plurality of LANs and the second WAN optimizer in a fourth LAN of the plurality of LANs based on evaluation of one or more first measurements of a first tunnel between a first local WAN edge router local to the first host and a second local WAN edge router local to the second host, one or more second measurements of a second tunnel between the first local WAN edge router and the first WAN edge router, one or more third measurements of a third tunnel between the second local WAN edge router and the second WAN edge router, and one or more fourth measurements of a fourth tunnel between the first WAN edge router and the second WAN edge router; and routing the first traffic from the first local WAN edge router to the first WAN optimizer via the second tunnel and the second traffic from the second local WAN edge router to the second WAN optimizer via the third tunnel.

7. The computer-implemented method of claim 1, further comprising:

determining there is no WAN optimizer local to the second host that has capacity to perform the one or more second WAN optimization services and the one or more second complementary WAN optimization services; and provisioning the second WAN optimizer in the second LAN.

8. A non-transitory computer-readable storage medium including instructions that, when executed by one or more processors of a system, cause the system to perform operations comprising:

receive a request for a wide area network (WAN) optimized connection between a first host within a first local area network (LAN) of a plurality of LANs and a second host within a second LAN of the plurality of LANs;

identify a first WAN optimizer that has capacity to perform one or more WAN optimization services for traffic transmitted between the first host and the second host and a second WAN optimizer that has capacity to perform one or more complementary WAN optimization services of the one or more WAN optimization services to the traffic transmitted between the first host and the second host;

establish the WAN optimized connection between the first host and the second host, the WAN optimized connection comprising a first path including the first host, the first WAN optimizer, and a first WAN edge router local to the first WAN optimizer, a second path between the first WAN edge router and a second WAN edge router local to the second WAN optimizer, and a third path between the second WAN edge router and the second WAN optimizer; and route the traffic through the WAN optimized connection.

9. The non-transitory computer-readable storage medium of claim 8, the operations further comprising:

provision one or more network security appliances that allow traffic whose sequence numbers are outside of a specified range of previous traffic; and update the WAN optimized connection to include the one or more network security appliances in between the first WAN optimizer and the second WAN optimizer.

10. The non-transitory computer-readable storage medium of claim 8, the operations further comprising:

monitor a capacity of each of the plurality of WAN optimizers to perform WAN optimization services on traffic transmitted among a plurality of WAN edge routers.

11. The non-transitory computer-readable storage medium of claim 8, the operations further comprising:

determine there is no WAN optimizer local to the second host that has capacity to perform the one or more second WAN optimization services and the one or more second complementary WAN optimization services;

select the second WAN optimizer in a third LAN of the plurality of LANs based on evaluation of one or more first measurements of a first tunnel between a local WAN edge router local to the second host and the first WAN edge router, one or more second measurements of a second tunnel between the local WAN edge router and the second WAN edge router, and one or more third measurements of a third tunnel between the second WAN edge router and the first WAN edge router; and route the second traffic from the local WAN edge router to the second WAN optimizer via the second tunnel and the first traffic from the first WAN edge router to the second WAN optimizer via the third tunnel.

12. The non-transitory computer-readable storage medium of claim 8, the operations further comprising:

determine there is no WAN optimizer local to the first host that has capacity to perform the one or more first WAN optimization services and the one or more first complementary WAN optimization services;

select the first WAN optimizer in a third LAN of the plurality of LANs based on evaluation of one or more first measurements of a first tunnel between a local WAN edge router local to the first host and the second WAN edge router, one or more second measurements of a second tunnel between the local WAN edge router and the first WAN edge router, and one or more third measurements of a third tunnel between the first WAN edge router and the second WAN edge router; and route the first traffic from the local WAN edge router to the first WAN optimizer via the second tunnel and the second traffic from the second WAN edge router to the first WAN optimizer via the third tunnel.

13. The non-transitory computer-readable storage medium of claim 8, the operations further comprising:

determine there is no WAN optimizer local to the first host that has capacity to perform the one or more first WAN optimization services and the one or more first complementary WAN optimization services, and there is no WAN optimizer local to the second host that has capacity to perform the one or more second WAN optimization services and the one or more second complementary WAN optimization services;

select the first WAN optimizer in a third LAN of the plurality of LANs and the second WAN optimizer in a fourth LAN of the plurality of LANs based on evaluation of one or more first measurements of a first tunnel between a first local WAN edge router local to the first host and a second local WAN edge router local to the second host, one or more second measurements of a second tunnel between the first local WAN edge router and the first WAN edge router, one or more third measurements of a third tunnel between the second local WAN edge router and the second WAN edge router, and one or more fourth measurements of a fourth tunnel between the first WAN edge router and the second WAN edge router; and routing the first traffic from the first local WAN edge router to the first WAN optimizer via the second tunnel and the second traffic from the second local WAN edge router to the second WAN optimizer via the third tunnel.

14. The non-transitory computer-readable storage medium of claim 8, the operations further comprising:

determine there is no WAN optimizer local to the second host that has capacity to perform the one or more second WAN optimization services and the one or more second complementary WAN optimization services; and provision the second WAN optimizer in the second LAN.

15. A system, comprising:

one or more processors; and non-transitory computer readable memory including instructions that, when executed by the one or more processors, cause the system to perform operations comprising:

receive a request for a wide area network (WAN) optimized connection between a first host within a first local area network (LAN) of a plurality of LANs and a second host within a second LAN of the plurality of LANs;

identify a first WAN optimizer that has capacity to perform one or more WAN optimization services for traffic transmitted between the first host and the second host and a second WAN optimizer that has capacity to perform one or more complementary WAN optimization services of the one or more WAN optimization services to the traffic transmitted between the first host and the second host;

establish the WAN optimized connection between the first host and the second host, the WAN optimized connection comprising a first path including the first host, the first WAN optimizer, and a first WAN edge router local to the first WAN optimizer, a second path between the first WAN edge router and a second WAN edge router local to the second WAN optimizer, and a third path between the second WAN edge router and the second WAN optimizer; and route the traffic through the WAN optimized connection.

16. The system of claim 15, the operations further comprising:

provision one or more network security appliances that allow traffic whose sequence numbers are outside of a specified range of previous traffic; and update the WAN optimized connection to include the one or more network security appliances in between the first WAN optimizer and the second WAN optimizer.

17. The system of claim 15, the operations further comprising:

monitor a capacity of each of the plurality of WAN optimizers to perform WAN optimization services on traffic transmitted among a plurality of WAN edge routers.

18. The system of claim 15, the operations further comprising:

determine there is no WAN optimizer local to the first host that has capacity to perform the one or more first WAN optimization services and the one or more first complementary WAN optimization services;

select the first WAN optimizer in a third LAN of the plurality of LANs based on evaluation of one or more first measurements of a first tunnel between a local WAN edge router local to the first host and the second WAN edge router, one or more second measurements of a second tunnel between the local WAN edge router and the first WAN edge router, and one or more third measurements of a third tunnel between the first WAN edge router and the second WAN edge router; and route the first traffic from the local WAN edge router to the first WAN optimizer via the second tunnel and the second traffic from the second WAN edge router to the first WAN optimizer via the third tunnel.

19. The system of claim 15, the operations further comprising:

determine there is no WAN optimizer local to the first host that has capacity to perform the one or more first WAN optimization services and the one or more first complementary WAN optimization services, and there is no WAN optimizer local to the second host that has capacity to perform the one or more second WAN optimization services and the one or more second complementary WAN optimization services;

select the first WAN optimizer in a third LAN of the plurality of LANs and the second WAN optimizer in a fourth LAN of the plurality of LANs based on evaluation of one or more first measurements of a first tunnel between a first local WAN edge router local to the first host and a second local WAN edge router local to the second host, one or more second measurements of a second tunnel between the first local WAN edge router and the first WAN edge router, one or more third measurements of a third tunnel between the second local WAN edge router and the second WAN edge router, and one or more fourth measurements of a fourth tunnel between the first WAN edge router and the second WAN edge router; and routing the first traffic from the first local WAN edge router to the first WAN optimizer via the second tunnel and the second traffic from the second local WAN edge router to the second WAN optimizer via the third tunnel.

20. The system of claim 15, the operations further comprising:

determine there is no WAN optimizer local to the second host that has capacity to perform the one or more second WAN optimization services and the one or more second complementary WAN optimization services; and provision the second WAN optimizer in the second LAN.

\* \* \* \* \*